US011577722B1

(12) United States Patent
Packer et al.

(10) Patent No.: US 11,577,722 B1
(45) Date of Patent: Feb. 14, 2023

(54) HYPER PLANNING BASED ON OBJECT AND/OR REGION

(71) Applicant: Zoox, Inc., Foster City, CA (US)

(72) Inventors: Jefferson Bradfield Packer, San Francisco, CA (US); Sarah Tariq, Palo Alto, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 372 days.

(21) Appl. No.: 16/587,892

(22) Filed: Sep. 30, 2019

(51) Int. Cl.
| | |
|---|---|
| *B60W 30/095* | (2012.01) |
| *G05D 1/02* | (2020.01) |
| *G05D 1/00* | (2006.01) |
| *G06V 20/58* | (2022.01) |
| *G06V 40/16* | (2022.01) |

(52) U.S. Cl.
CPC ....... *B60W 30/0956* (2013.01); *G05D 1/0088* (2013.01); *G05D 1/0238* (2013.01); *G06V 20/58* (2022.01); *G06V 40/161* (2022.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 10,156,850 | B1 * | 12/2018 | Ansari | B60W 30/0953 |
| 10,216,189 | B1 * | 2/2019 | Haynes | G06T 7/70 |
| 11,165,954 | B1 * | 11/2021 | Beach | H04N 5/23225 |
| 2016/0357187 | A1 * | 12/2016 | Ansari | G01S 13/862 |
| 2017/0329332 | A1 * | 11/2017 | Pilarski | B60W 30/095 |
| 2018/0005407 | A1 * | 1/2018 | Browning | B60W 30/095 |
| 2018/0336424 | A1 * | 11/2018 | Jang | B60W 30/0956 |
| 2019/0049968 | A1 * | 2/2019 | Dean | G05D 1/0214 |
| 2019/0220014 | A1 * | 7/2019 | Bradley | G06N 20/00 |
| 2020/0070822 | A1 * | 3/2020 | Yamada | B60W 60/00276 |
| 2020/0298891 | A1 * | 9/2020 | Liang | G01S 17/89 |
| 2020/0326703 | A1 * | 10/2020 | Li | B60W 60/001 |

* cited by examiner

*Primary Examiner* — Sze-Hon Kong
*Assistant Examiner* — Davin Seol
(74) *Attorney, Agent, or Firm* — Lee & Hayes, P.C.

(57) ABSTRACT

A vehicle computing system may implement techniques to predict behavior of objects detected by a vehicle operating in the environment. The techniques may include determining a feature with respect to a detected objects (e.g., likelihood that the detected object will impact operation of the vehicle) and/or a location of the vehicle and determining based on the feature a model to use to predict behavior (e.g., estimated states) of proximate objects (e.g., the detected object). The model may be configured to use one or more algorithms, classifiers, and/or computational resources to predict the behavior. Different models may be used to predict behavior of different objects and/or regions in the environment. Each model may receive sensor data as an input, and output predicted behavior for the detected object. Based on the predicted behavior of the object, a vehicle computing system may control operation of the vehicle.

20 Claims, 5 Drawing Sheets

HYPER PLANNING BASED ON OBJECT AND/OR REGION

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. The planning systems may perform any number of operations (e.g., simulations, etc.) to determine an effect of each detected object on a potential action for the vehicle. However, in environments with a large number of objects, performing such operations on each detected object may be computationally costly and, in some cases, impossible with onboard computing capabilities.

Additionally, when simulations are performed using the onboard computing capabilities, the simulations may be limited in detail or in the number or complexity of simulations that can be run.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
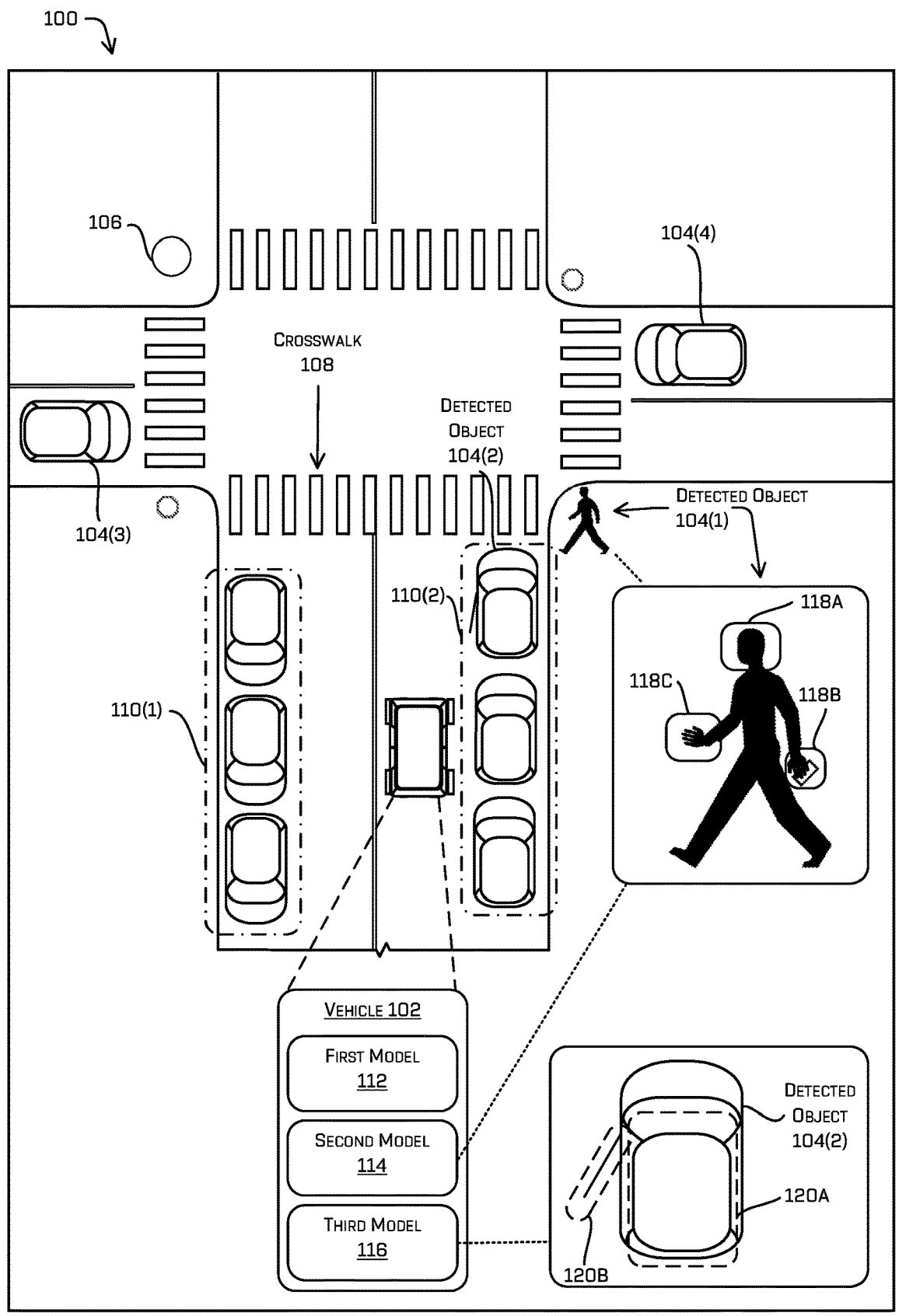
FIG. 1 is an illustration of an example environment, in which an example vehicle applies different models to predict behavior for different objects and/or regions in the environment.

As noted above, performing all possible operations on each detected object in an environment of a vehicle may be computationally costly and, in some cases, impossible with onboard computing capabilities. In addition, performing certain types of operations on objects may be limited due to available onboard computing capabilities. Still further, devoting a same level of computational resources to all objects in the environment may result in too much processing being devoted to certain objects/regions (e.g., objects or regions behind the vehicle or remote from a planned path of the vehicle) and/or not enough processing being devoted to other objects/regions (e.g., objects in or near the vehicles planned path or with which the vehicle is likely to interact, or rejoins proximate a blind intersection or occluded region).

This application describes techniques for applying different models for different objects and/or regions in an environment. In some examples, certain models may employ more computational resources (e.g., allocate more memory, processor cycles, processes, and/or more sophisticated/complex prediction algorithms) than others. For example, more fine-grained pedestrian behaviors may rely on models which take pedestrian hand-signals, eye-gaze, head directions, and the like into account. Such models may be necessary for interacting with a pedestrian in a crosswalk, though not for other pedestrian interactions. In some examples, a model used for a particular object or region may be chosen based on a feature of the particular object or region. By way of example and not limitation, features of an object or region may comprise one or more of a likelihood of the object (or objects in the region) to impact operation of the vehicle (e.g., potential for collision or to cause the vehicle to change trajectory to avoid the object), a classification of the object (e.g., pedestrian, bicycle, vehicle, etc.) or region (e.g., occupied, occluded, etc.), a location of the object or region in the environment relative to the vehicle, a proximity of the object or region to the vehicle, a planned path of the vehicle, or a proximity of the object or region to another object and/or position in the environment, or other factors. The model chosen may direct available computational resources to the most relevant objects during vehicle planning thereby improving vehicle safety as the vehicle navigates in the environment. In addition, by dedicating less computational resources to less relevant objects, models have more computational resources available to devote to behavior predictions for the most relevant objects.

Models used by an autonomous driving vehicle as described herein may be designed to perform different levels of prediction processing analogous to how a driver of a traditional vehicle pays attention while driving. For example, models may be designed to devote more computational resources to objects near certain areas (e.g., crosswalks, rows of parked cars, narrow roads, intersections, or school zones, to just name a few), objects of certain types (e.g., groups of pedestrians, skateboarders, kids, animals, etc.), objects that are behaving unpredictably or uncharacteristically (e.g., vehicles or pedestrians violating traffic laws, moving erratically, etc.), and/or unrecognized objects, than to other objects or regions. In some examples, models may devote fewer computational resources to objects that are moving away from the vehicle, are located behind the vehicle, are remote from a planned path of the vehicle, are moving slowly, and/or are otherwise unlikely to impact operation of the vehicle.

The vehicle may detect objects using one or more sensors while navigating in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. The vehicle computing system may detect the relevance of objects. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be input into the models to predict behavior (e.g., one or more predicted trajectories, locations, speeds, poses, and so on) of objects in the environment. As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

As discussed above, in some examples, different models may be applied to a single object, different objects and/or regions in the environment. For example, the vehicle may input sensor data to a first model to detect an object (e.g., a pedestrian proximate to a crosswalk) and may input at least a portion of the sensor data into a second model that may employ more computing resources and/or use different (e.g., more sophisticated) classifiers than the first model. In some examples, the first model may comprise a first machine learned model trained to predict behavior of objects based on first features (e.g., a velocity, trajectory, and/or pose) and the second model may comprise a second machine learned model trained to predict behavior of objects based on second features (e.g., in the case of a pedestrian, face detection, facial recognition, gaze detection, and/or gesture recognition). The output of the models may be used by a vehicle computing system (e.g., a planning component of the vehicle computing system) to control operation of the vehicle. Predictions from models that utilize different levels of computation may be fed to a planning component of the vehicle to improve how the vehicle navigates (avoids and/or interacts with objects) in the environment.

In some examples, the vehicle computing system may be configured to semantically classify the detected objects. A classification may include another vehicle (e.g., car, a pick-up truck, a semi-trailer truck, a tractor, a bus, a train, etc.), a pedestrian, a bicyclist, an equestrian, or the like. For example, the vehicle computing system may detect two objects and classify a first object as a pedestrian and a second object as a pick-up truck. In one particular example, a model may be determined for an object based on a semantic classification of the object. In some examples, a model for a pedestrian may be trained to detect gestures, faces, gaze direction, or other features to predict how the pedestrian is likely to behave. In another particular example, a model for a vehicle that is moving toward a side of the road may be trained to detect features indicative of whether a vehicle door will open (e.g., to allow passengers in or out).

As noted above, in some examples, models may provide more behavior prediction processing for more relevant objects, and less behavior prediction processing for models associated with less relevant objects. An object may be relevant to the vehicle if the object and the vehicle could potentially occupy the same space or come within a threshold distance of one another over a period of time (e.g., potential for an accident). Additionally or alternatively, an object may be relevant to the vehicle if the object is within a region of interest identified by the vehicle. For example, a determination of relevance may be based on a location of an object relative to the vehicle, a trajectory of the object (e.g., direction, speed, acceleration, etc.), a type of object, an object's proximity to a region of interest, or the like. For example, at a first time, a pedestrian may be located near a crosswalk and may be determined to be relevant to the vehicle. Accordingly, sensor data representative of the pedestrian at the first time may be input to a first model that employs first computational resources in a simulation or other vehicle control planning operation at the first time. The first model may include heightened processing (e.g., gesture recognition to detect hand signals of the pedestrian and/or gaze detection to detect whether the eyes of the pedestrian are looking towards the crosswalk, etc.) to more accurately predict behavior of the pedestrian. At a second time, the pedestrian may continue walking past the crosswalk and may therefore be determined to no longer be relevant (or to be less relevant) to the vehicle. Based on a determination that an object is irrelevant (or less relevant) to the vehicle at the second time, the vehicle may input sensor data representative of the pedestrian to a second model that employs second computational resources, which are different than the first computational resources of the first model. In some examples, the first model may use more computational resources (e.g., use more memory, processor cycles, processes, and/or more sophisticated algorithms) than the second model. In some examples, at the second time, the object may be treated differently in future operations (e.g., estimated states of the vehicle and/or object) by the models and/or other vehicle control planning considerations. For the purposes of this discussion, operations and/or an estimated state may include predicted locations of the vehicle and one or more objects at a particular time in the future (e.g., time after a current/initial time). Additional examples of determining relevance of an object are described in U.S. patent application Ser. No. 16/530,515, filed on Aug. 2, 2019, entitled "Relevant Object Detection," Ser. No. 16/417,260, filed on May 30, 2019, entitled "Object Relevance Determination," and Ser. No. 16/389,720, filed on May 6, 2019, entitled "Dynamic Object Relevance Determination," all of which are incorporated herein by reference.

By way of example and not limitation, a model may output behavior predictions for objects in a region of interest around the vehicle. In some examples, a model may process the objects within the region of interest using a different model than for objects outside the region of interest (e.g., running facial recognition for all pedestrians within a threshold distance of the vehicle). In some examples, a model may be applied to fewer than all the objects in a region of interest (e.g., running facial recognition for a pedestrian among the group of pedestrians that is within a threshold distance of the vehicle and moving towards the vehicle rather than away from the vehicle). In various examples, a vehicle computing system of a vehicle may use a model to run gesture recognition and/or facial recognition on a region around the vehicle to identify a rider that the vehicle intends to pick-up. The region of interest may be determined based at least in part on a region being near the vehicle (e.g., a threshold distance), a region that includes a planned path of the vehicle, a region in which the vehicle is likely to interact with an object (e.g., an intersection, crosswalk, etc.), proximity of additional objects and/or an identifier in a map (stop sign, traffic light, crosswalk, lane, building, intersection, etc.) to the object, a region with unknown objects, a combination thereof, and so on.

In some examples, selection of one or more models to apply in a given circumstance may be based at least in part on a hierarchical arrangement. In such examples, models may have a predecessor and/or a successor to implement increasing or decreasing levels of detection and/or behavior prediction. For instance, a first model may be a baseline (e.g., parent) model that detects, classifies, or recognizes objects and/or regions. Depending on the feature(s) detected by the first model, one or more additional models (e.g., child models) may be employed to perform additional operations (e.g., detections, classifications, predictions, etc.) associated with the features detected by the first model. Each of these child models may in turn have one or more child models (e.g., grandchildren). The child and grandchild models may be selected to identify a greater level of detail in the environment based at least in part on a feature detected by the parent model. By way of example and not limitation, if the first model (the parent) detects a car, the second model (a first child) may be run to, for example, predict a route for the car while a third model (a child of the first child) may be used to predict whether or not the car is parking or just stopping temporarily. Additional models for the car may be run for when the car is stationary, traveling forward or reverse, turning, approaching a yellow light, and so on depending upon attributes of the environment and/or actions of other objects in the environment. In such hierarchical examples, the model(s) used in a given circumstance may be chosen based on the hierarchical relationship between the models. However, in other examples, one or more models used in a given circumstance may be determined in other ways (e.g., simply based on an output of a sensor or perception component).

Portions of the environment may be obscured or otherwise occluded by an object and may be referred to as occluded regions. Because of the lack of sensor data associated with an occluded region, it may be difficult to determine whether the occluded region is free of any objects or obstacles or whether the occluded region is occupied by a static obstacle or a dynamic object such as a vehicle or pedestrian. In some examples, models may predict a candidate trajectory for a vehicle navigating in an environment, and motion of the vehicle can be simulated along the candidate trajectory to determine predicted occluded regions associated with the candidate trajectory. For example, positions of the vehicle along the candidate trajectory in the future can be determined and occluded regions can be predicted based on locations of the vehicle and object(s) to determine predicted occluded regions. In some examples, a model may process the objects that are proximate to an occluded region using a different (e.g., heighted or more sophisticated) model than for objects that are not proximate an occluded region (e.g., running facial recognition for all pedestrians within a threshold distance of the vehicle, or running a head detection algorithm for portions of sensor data proximate an occluded region). Additional details of predicting occupancy of an occluded region are described in U.S. patent application Ser. No. 16/399,743, filed Apr. 30, 2019, entitled "Predicting an Occupancy Associated With Occluded Region," which is incorporated herein by reference.

In some examples, models may define different computational resources, algorithms, and/or classifiers to perform behavior prediction and/or detection techniques (e.g., running gesture recognition in an area around a traffic light). In some examples, a model may perform different types and/or levels of prediction processing depending upon computational resource(s), algorithm(s), and/or classifier(s) associated with the model. In some examples, one or more models may cause different types and/or levels of detection to be performed on a single object or a group of objects. Performing less detection when not needed increases an amount of memory resources and/or processing resources available to the vehicle which improves operation of the vehicle (additional resources are available to support further computations, and in some examples implementing models capable of more complex behavior prediction). In addition, the model may provide predictions that improve safe operation of the vehicle by predicting behavior of the object with different levels of detail (e.g., predicts a candidate trajectory with more accuracy).

A vehicle computing system may dedicate available resources (e.g., a memory resource and/or a processing resource) to models to provide more of the available resources to models processing more relevant objects, and less resources for models processing less relevant objects. By way of example and not limitation, a model may perform a higher level of processing for a near-by vehicle that is pulling over (e.g., may implement a finer level of movement detection to detect a person exiting the vehicle) as compared to a level of processing used by a model that detects actions of a pedestrian located behind the vehicle (e.g., a coarser level of movement detection since the pedestrian is less likely to impact operation of the vehicle). In some examples, objects determined not to be relevant to a potential action of the vehicle may undergo different predictive processing (simulations, estimated states, interaction modeling, collision estimation, etc.) by a model to reduce computational load during vehicle planning. By determining a model according to relevance of an object, memory and processing resources are made available to models that predict behavior for the objects most likely to impact the safe operation of the vehicle in the environment. In this way, the models can be thought of as providing different levels of "attention" to different objects.

In some examples, a computational resource defined by a model for use to predict behavior may be representative of a memory resource, a processing resource, and/or a computational time. In some examples, models may define memory resources to use during prediction processing (e.g., memory amount, memory location, memory type, and the like). For instance, more memory allocation may be used by a model that performs finer levels of movement detection (e.g., to identify gestures of a detected pedestrian) as compared to a model that performs coarser levels of movement detection. A vehicle computing system may allocate an amount of memory, a type of memory, and/or a memory location to make the best use of available memory resources to models that predict object behavior. In some examples, models may make use of memory resources that are remote from the vehicle (e.g., a remote server or a remote vehicle). Detected objects that are determined to have no impact on operation of the vehicle may be associated with a model that performs different prediction processing (e.g., accessing fewer available memory resources) thereby enabling more memory resources to be available to models that correspond to objects having a higher likelihood of impacting operation of the vehicle.

In some examples, a model may define processing resources (e.g., processor amount, processor cycles, processor cores, processor location, processor type, and the like) to use to predict a behavior of the detected object. A vehicle computing system that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict behavior of an object by processing the object using a GPU, CPU, or a combination thereof. In this way, each model may be defined to utilize the processing resources that enable the model to perform predictions in the least amount of time (e.g., to use the predicted behavior in planning considerations of the vehicle). In this way, models may be allocated to objects to make the best use of available processing resources and enable more predictions that may improve how a vehicle navigates in relation to the objects.

In some examples, a model may define an algorithm for use in predicting behavior of an object. In some examples, a model to predict object behavior may include one or more machine learned algorithm(s) to identify, detect, and/or classify attributes of a detected object. In some examples, the model may include one or more classifiers. A classifier can be representative of a decision tree, a Neural Network, a Naïve Bayes classifier, and/or other algorithm(s) that perform classification. In some examples, a classifier may represent a function that assigns a class or label to an object, targets an object in an environment, and/or categorizes an object. In some examples, a classifier can be used with a machine learning technique to train a model to perform a function (e.g., detect attributes of an object, etc.). For instance, a first model may detect that an object is a vehicle, and then the first model (or alternatively a second model) may run additional classifiers related to the vehicle to make a more detailed prediction about the behavior of the object (e.g., classifying an overall condition of the vehicle, etc.).

In some examples, a model may predict behavior of an object using various detection and recognition techniques. By way of example and not limitation, a model may predict object behavior using gesture recognition, pedestrian detection, head detection, hand detection, gaze detection, behavior detection, attention detection, pattern recognition, door opening detection, vehicle occupant detection, just to name a few. In some examples, predictions by a model may be determined utilizing machine learned techniques that implement one or more of the detection and/or recognition techniques usable by the model noted above and below.

In various examples, a vehicle computing system may receive one or more instructions representative of output(s) from one or more models. The vehicle computing system may, for instance, send an instruction from the one or more instructions to a perception component of the vehicle that modifies operation of one or more sensors on the vehicle and/or how sensor data from one or more sensors are captured and/or stored. In such examples, the instruction may cause a change in processing by the sensor(s) (e.g., slow down processing, speed up processing, do more processing, do less processing, etc.). In some examples, the instruction sent to the perception component causes a change to a resolution, a bit rate, a rate of capture, and/or a compression at which sensor data of one or more sensor(s) is captured, stored, and/or input into the models. In some examples, modifying sensor(s) and/or sensor data of the vehicle provides sensor data to the model that is usable for finer levels of prediction (e.g., more detail around a detected object, searching portions of a detected object for more attributes, etc.) or provides sensor data to the model that is usable for coarser levels of prediction (e.g., less resolution or capture rate for objects behind a vehicle or moving away from the vehicle). Additionally or alternatively, output(s) from one or more models may be stored by the vehicle computing system for training a machine learned model.

In some examples, the vehicle computing system may send an instruction to a sensor or perception component of the vehicle that modifies an input or a pipeline of the sensor or perception component. For instance, the instruction to the sensor or perception component may change how the sensor captures or outputs sensor data and/or how the perception component perceives and/or detects information about the environment based on the sensor data. In some examples, different detection and/or recognition techniques may be implemented based at least in part on the instruction received at the perception component from the model.

The vehicle computing system may be configured to determine an initial position of each detected object. In various examples, the vehicle computing system (e.g., models that predict behavior of an object) may determine one or more predicted trajectories associated with each detected object, such as from an initial position associated therewith. In some examples, the one or more predicted trajectories may be determined based on the sensor data. Each predicted trajectory may represent a potential path that the detected object may travel through the environment. The one or more predicted trajectories may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof. In some examples, the one or more predicted trajectories may be determined based on an assumption that the vehicle will maintain a substantially constant velocity and/or direction of travel. In such examples, the one or more predicted trajectories may be based on an initial velocity and/or direction of travel determined based on the sensor data. In some examples, the one or more predicted trajectories may be determined or represented using a probabilistic heat map to predict object behavior, such as that described in U.S. patent application Ser. No. 15/807,521, filed Nov. 8, 2017, entitled "Probabilistic Heat Maps for Behavior Prediction," which is incorporated herein by reference. In some examples, the one or more predicted trajectories may be determined utilizing machine learning techniques.

In various examples, the vehicle computing system may be configured to determine actions to take while operating (e.g., trajectories to use to control the vehicle) based on the models predicting behavior of the relevant objects. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

In various examples, the vehicle computing system may be configured to determine reference actions and/or sub-actions that are applicable to the vehicle in the environment. For example, lane changes may not be applicable reference actions for a vehicle operating on a single-lane road. For another example, accelerating may not be an applicable sub-action for a vehicle operating at a speed limit.

For each applicable action and sub-action, the vehicle computing system may implement different models to simulate future states (e.g., estimated states) by projecting the vehicle and relevant object(s) forward in the environment for the period of time (e.g., 5 seconds, 8 seconds, 12 seconds, etc.). The models may project the relevant object(s) (e.g., estimate future positions of the object(s)) forward based on a predicted trajectory associated therewith. The models may project the vehicle (e.g., estimate future positions of the vehicle) forward based on a vehicle trajectory associated with an action. The estimated state(s) may represent an estimated position (e.g., estimated location) of the vehicle and an estimated position of the relevant object(s) at a time in the future. In some examples, the models may determine relative data between the vehicle and the relevant object(s) in the estimated state(s). In such examples, the relative data may include distances, locations, speeds, directions of travel, and/or other factors between the vehicle and the object. In various examples, the vehicle computing system may determine estimated states at a pre-determined rate (e.g., 10 Hertz, 20 Hertz, 50 Hertz, etc.) throughout a set of estimated states (e.g., group of estimated states representing the estimated positions of the vehicle and/or object throughout the period of time). In at least one example, the estimated states may be performed at a rate of 10 Hertz (e.g., 80 estimated states over an 8 second period of time). In some examples, the models may determine estimated states of the vehicle and the object at various time intervals substantially in parallel. In such examples, the models may decrease a time required to generate a set of estimated states over the period of time.

In various examples, the models may evaluate a location and/or a trajectory of the vehicle compared to a location and/or a predicted trajectory of a relevant object of the one or more relevant objects in an estimated state to determine if the relevance of an object has changed (increased or decreased). In some examples, the models may utilize machine learned techniques to verify the continued relevance of a previously determined relevant object.

In some examples, the vehicle computing system may change a model to apply to the object over time as the relevance of the object changes. For instance, based on a determination of relevance of an object during a relevance verification, the vehicle computing system may select a model to apply to the object based at least in part on the relevance of the object. In examples based on a determination of irrelevance of an object during the relevance verification, the vehicle computing system may apply a model that performs a minimal amount of prediction processing.

In various examples, the vehicle computing system may store sensor data associated with actual location of a relevant object at the end of the set of estimated states (e.g., end of the period of time) and use this data as training data to train one or more models. In some examples, the vehicle computing system may provide the data to a remote computing device (i.e., computing device separate from vehicle computing system) for data analysis. In such examples, the remote computing system may analyze the sensor data to determine an actual location, velocity, direction of travel, or the like of the relevant object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference.

The techniques discussed herein may improve a functioning of a vehicle computing system in a number of ways. Traditionally, in control planning for an autonomous vehicle, a vehicle computing system may consider each detected dynamic object in an environment. The vehicle computing system may determine an action for the autonomous vehicle to take based on the detected objects. However, including each detected object in planning considerations (e.g., trajectory determinations, calculations, etc.) can be extremely computationally expensive, particularly when there are numerous objects in an environment. By performing an initial relevance determination of the detected objects in an environment, the techniques described herein may reduce a computational load to simulate predicted trajectories of objects in the environment, thereby improving the functioning of the vehicle computing system.

Additionally, the models described herein may perform one or more predictions to predict future relative positions and/or trajectories of a vehicle and relevant object(s). The models may determine, during the relevance verification, that a previously determined relevant object is no longer relevant to the vehicle (e.g., will not occupy the same space and time in the future). The models may treat the previously determined relevant object differently in future predictions, thereby further reducing computational load to predict trajectories of objects in the environment and improving the functioning of the vehicle computing system.

The techniques discussed herein may also improve a functioning of a vehicle computing system by receiving predictions from a model that provides additional detail for the most relevant objects. In some examples, the most relevant objects may be based on an object class, or a distance of the object from the vehicle. In some examples, the vehicle computing system may improve safety by spending more processing resources on models associated with objects most likely to impact the safety of the vehicle. As a result, the vehicle computing system can control operation of the vehicle by utilizing planning considerations from the models that are more detailed and have a finer granularity than traditional planning considerations that predicted actions of objects by applying similar prediction techniques to all objects. The techniques discussed herein may improve a functioning of a vehicle computing system by gaining computational resources (e.g., repurposing available computational resources) that otherwise would be spent on models associated with objects less likely to impact the safety of the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) in an environment 100, in which an example behavior prediction model may predict behavior for different objects and/or regions using different levels of processing (e.g., computational time, memory and/or processors allocation, number of potential trajectories to simulate, etc.). A vehicle computing system (e.g., vehicle computing system 404) may implement the behavior prediction models of the vehicle 102. While described as a separate system, in some examples, the behavior prediction techniques described herein may be implemented by other vehicle systems, components, and/or computing devices. For example, and as will be described in further detail with regard to FIG. 4, the behavior prediction techniques described herein may be implemented at least partially by or in association with a model component 430 and/or a planning component 424.

In various examples, the vehicle computing system may be configured to detect one or more objects 104 (e.g., objects 104(1), 104(2), 104(3), 104(4)) in the environment 100, such as via a perception component (e.g., perception component 422). In some examples, the vehicle computing system may detect the object(s) 104, based on sensor data received from one or more sensors. In some examples, the sensor(s) may include sensors mounted on the vehicle 102, and include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors 106 mounted in the environment 100.

In various examples, vehicle 102 may be configured to transmit and/or receive data from other autonomous vehicles and/or the sensors 106. The data may include sensor data, such as data regarding object(s) 104 detected in the environment 100. In various examples, the environment 100 may include the sensors 106 for traffic monitoring, collision avoidance, or the like. In some examples, the sensors 106 may be mounted in the environment to provide additional visibility in an area of reduced visibility, such as, for example, in a blind or semi-blind intersection. For example, an intersection in the environment 100 may be determined to have a blind intersection, where approaching vehicles may not be able to perceive object(s) 104 and/or other vehicles approaching from the left or right on the intersecting road. The intersection in the environment may thus include a sensor 106 to provide sensor data to an approaching vehicle 102 regarding an object 104, such as objects 104(3) and 104(4), located on the intersecting road.

In various examples, the vehicle computing system may receive the sensor data and may determine a type of object 104 (e.g., classify the type of object), such as, for example, whether the object 104 is a car, such as objects 104(2), 104(3), and 104(4), a truck, motorcycle, moped, bicyclist, pedestrian, such as object 104(1), or the like.

FIG. 1 also depicts the environment 100 as including a crosswalk 108 and rows of parked cars 110(1) and 110(2). In some examples, different models may be applied to objects proximate to the crosswalk 108 (such as object 104(1)) and/or the rows of parked cars 110(1) and 110(2) (such as object 104(2)). In some examples, more sophisticated models and/or more models employing greater computational resources may be applied to the objects 104 most likely to impact operation of the vehicle 102.

In various examples, the vehicle 102 may include a first model 112, a second model 114, and a third model 116 usable for predicting behavior of one or more objects 104. The first model 112, second model 114, and third model 116 may predict behavior in a variety of ways by implementing different computations and/or classifiers specific to each model that enable different levels (e.g., low, normal, heightened) of processing during behavior prediction. Generally, each of the first model 112, the second model 114, and the third model 116 may predict movement by the detected objects 104 within the environment 100. In various examples, sensor data representing the detected objects 104 may be input into one or more of the first model 112, the second model 114, and the third model 116 to predict behavior of objects in the environment.

In some examples, one or more of the first model 112, the second model 114, and the third model 116 may be employed to predict behavior of different objects 104 in the environment. In the illustrated example, the vehicle 102 inputs sensor data into the first model 112 that performs a first level of behavior prediction (e.g., generic object behavior prediction without regard to object classification). Upon detecting that the object 104(1) is a pedestrian proximate the crosswalk 108, a vehicle computing system of the vehicle 102 applies the second model 114 that performs prediction operations 118. In the illustrated example, the vehicle 102 inputs at least a portion of the sensor data associated with the pedestrian 104(1) into the second model 114 that may employ more computing resources and/or use different (e.g., more sophisticated) classifiers than the first model 112.

In various examples, the second model 114 may perform prediction operations 118 that include facial recognition 118A, object detection 118B, and/or gesture detection 118C. In some examples, the second model 114 employs facial recognition to identify the pedestrian (e.g., as a rider waiting for a pick-up from the vehicle 102). In some examples, an inability to recognize a face by the second model 114 may indicate that the pedestrian is not paying attention to traffic which may result in a planning component of the vehicle 102 operating the vehicle with more caution (e.g., driving more slowly). In some examples, the vehicle 102 may employ an additional model (not shown) that detects finer levels of movement by the object 104(1) (e.g., motion detection at a finer resolution than a previously used resolution).

In various examples, the second model 114 may employ object detection 118B during predictive processing. As noted above, the first model 112 may detect object 104(1) as a pedestrian proximate to a crosswalk and determine that the detected object has a high likelihood of impacting the operation of the vehicle 102 (e.g., intersection between the vehicle 102 and the object 104(1) is more likely than for an object not near a crosswalk). In some examples, the second model 114 may be configured to detect or recognize additional details or attributes (e.g., detection of a computing device associated with pedestrian, detecting a gaze direction of the pedestrian, etc.) associated with the object 104(1) such that a prediction by the second model 114 has a higher level of granularity than the first model 112. In one particular example, the second model 114 may use gaze detection, and a prediction by the second model 114 may include that the pedestrian is staring at their computing device and is therefore unlikely to notice the vehicle 102 approaching. A planning component (e.g., planning component 424 of FIG. 4) of the vehicle 102 may use the predictions from the second model 114 to alter a route, change a trajectory, and/or change a velocity of the vehicle 102 (e.g., speed up, slow down, or stop) to optimize safety of the vehicle 102. By using predictions from the second model 114, the vehicle 102 can perform actions more likely to result in the vehicle 102 operating safely in the environment 100 as compared to only implementing the first model 112.

In various examples, the second model 114 may employ gesture detection 118C during predictive processing. In this illustrated example, the second model 114 detects gestures related to a hand of the pedestrian (object 104(1)), although any portion of the pedestrian may undergo gesture detection. In some examples, the second model 114 (alone or in combination with other models) determines whether the hand gesture of the pedestrian relates to the vehicle 102. For example, gesture detection 118C may differentiate among a gesture that "waves on" a vehicle (e.g., to indicate the pedestrian is yielding to the vehicle 102), a gesture that conveys a message that the pedestrian wants the vehicle 102 to stop (e.g., a hand held up to indicate stop), a gesture that is friendly (e.g., a wave to a passenger inside the vehicle 102), and/or a gesture that is unfriendly (e.g., a hand signal that demonstrates the pedestrian is angry or frustrated). Regardless of the gesture detected, the second model 114 can make predictions using the detected gesture that may cause a planning component of a vehicle computing system to control actions of the vehicle 102 to improve safe operation of the vehicle 102 over not using the second model 114.

In some examples, selection of one or more models to apply in a given circumstance may be based at least in part on a hierarchical arrangement. In such examples, models may have a predecessor and/or a successor to implement increasing or decreasing levels of detection and/or behavior prediction. For instance, a first model may be a baseline (e.g., parent) model that detects, classifies, or recognizes objects and/or regions. Depending on the feature(s) detected by the first model, one or more additional models (e.g., child models) may be employed to perform additional operations (e.g., detections, classifications, predictions, etc.) associated with the features detected by the first model. Each of these child models may in turn have one or more child models (e.g., grandchildren). The child and grandchild models may be selected to identify a greater level of detail in the environment based at least in part on a feature detected by the parent model. By way of example and not limitation, if the first model (the parent) detects a car, the second model (a first child) may be run to, for example, predict a route for the car while a third model (a child of the first child) may be used to predict whether or not the car is parking or just stopping temporarily. Additional models for the car may be run for when the car is stationary, traveling forward or reverse, turning, approaching a yellow light, and so on depending upon attributes of the environment and/or actions of other objects in the environment. In such hierarchical examples, the model(s) used in a given circumstance may be chosen based on the hierarchical relationship between the models. However, in other examples, one or more models used in a given circumstance may be determined in other ways (e.g., simply based on an output of a sensor or perception component).

In some examples, one or more of the first model 112, the second model 114, and/or the third model 116 may be determined for the objects 104 based on an interaction between the objects 104 and the vehicle 102. For instance, an interaction may refer to a communication by the object towards the vehicle 102 and/or a communication by the vehicle 102 towards the object 104. In some examples, a model (e.g., the second model 114) may be determined for a pedestrian making hand signals to a vehicle to identify whether the hand signals by the pedestrian are indicative of a desire for the vehicle 102 to stop to allow the pedestrian to cross, or is indicative of a desire by the pedestrian for the vehicle 102 to continue moving along the roadway without waiting for the pedestrian to enter the crosswalk. As illustrated in FIG. 1, the second model 114 implements gesture recognition to identify a meaning of the hand signals by the detected object 104(1) thereby ensuring that the vehicle 102 operates safely relative to the detected object 104(1).

Vehicles according to this disclosure may include, without limitation, one or more audio emitters (e.g., speakers, speaker arrays, horns, etc.) to audibly communicate with pedestrians or other nearby vehicles. In some examples, the vehicle 102 may communicate with the object 104(1)(e.g., a pedestrian) by way of emitting an audio signal to gain an object's attention. In some examples, a model may implement gaze detection to detect whether the pedestrian makes eye contact with the vehicle 102. If the model determines that the pedestrian made eye contact with the vehicle 102, the vehicle 102 may proceed with a different level of caution than when the pedestrian fails to make eye contact after the vehicle 102 emits the audio signal.

In some examples, prediction operations 118 (facial recognition 118A, object detection 118B, and/or gesture detection 118C in the illustrated example) may be combined in ways that yield further predictions by the second model 114. In some examples, a gesture captured by gesture detection 118C that "waves on" a vehicle (e.g., to indicate the pedestrian is yielding to the vehicle 102) may be given less importance by a planning component of the vehicle 102 when facial recognition 120A or gaze detection employed by second model 114 indicate that the pedestrian has not looked at the vehicle 102 while making the detected gesture (e.g., less likely the gesture was intended to convey a message to the vehicle 102). In some examples, combining gesture/detection operations may enable the second model 114 to predict that the gesture by the pedestrian was intended to be a wave to another pedestrian.

As shown in FIG. 1, the third model 116 may be employed by the vehicle 102 based at least in part on the first model 112 detecting the row of parked cars 110(2). In some examples, the third model 116 may detect finer levels of movement of the object 104(2) (e.g., a vehicle with a partially opened door). In various examples, the third model 116 may perform prediction operation 120A and/or prediction operation 120B to detect movement related to the object 104(2). In the illustrated example, the prediction operation 120A corresponds to performing detection inside the vehicle 102 (e.g., head detection to identify occupants, movement detection, etc.) to enable the third model 116 to make predictions about whether occupants of the object 104(2) are preparing to exit and likely be in the path of the vehicle 102. In various examples, the third model 116 may employ a door detector that detects door movement (e.g., whether a door of a vehicle is opening or closing). Using the prediction from the third model 116, a planning component may cause the vehicle 102 to proceed with more caution (e.g., based on the door opening) or operate with the same level of caution (e.g., based on the door closing). In some examples, head detection by the third model 116 may identify a number of occupants inside of the detected vehicle 104(2) and may cause the vehicle 102 to proceed with different levels of caution (e.g., same level of caution with no occupants, low level of caution when no occupants are detected, and a high level of caution when several occupants are detected).

In various examples, the vehicle computing system may determine one or more predicted object trajectories based on the predictions from one or more of the first model 112, the second model 114, and the third model 116. In some examples, the trajectories may include any number of potential paths in which the objects 104 may travel from a current position (e.g., at the time of perception) and/or based on a direction of travel. In some examples, a potential path for one of the objects 104 may include remaining stationary, such as object 104(3) stopped at an intersection in the environment 100. In such an example, the corresponding trajectory may represent little to no motion. In some examples, the number of trajectories may vary depending on a variety of factors, such as the classification of the object (e.g., type of object), other stationary and/or dynamic objects, drivable surfaces, etc.

In some examples, predictions by the first model 112, the second model 114, and/or the third model 116 associated with objects 104 may be based on active prediction. Active prediction includes determining potential and/or likely reactions an object 104 may have based on a potential action of vehicle 102. Using the example from above, the vehicle computing system may determine that the object 104(3) located in the intersection may accelerate or remain stopped based on the vehicle 102 approaching the intersection. Accordingly, the vehicle computing system may determine one or more predictions (via the first model 112, the second model 114, and/or the third model 116) associated with the object 104(3) based on a reaction to the vehicle 102.

In various examples, the predictions by the first model 112, the second model 114, and/or the third model 116 may be trained utilizing one or more machine learned algorithms. In such examples, the vehicle computing system, such as via the first model 112, the second model 114, and/or the third model 116, may receive the sensor data associated with the objects 104 and predict a behavior of the objects 104 based on the sensor data. For example, the vehicle computing system may be trained on captured image data of the objects 104 motion over time such that the vehicle computing system may recognize behavior that may predict future actions (e.g., candidate trajectories) the objects 104 may take. Additionally or in the alternative, the vehicle computing system may utilize heat maps, tree search methods, and/or temporal logic formulas to determine probabilities of one or more candidate trajectories of the objects 104.

In various examples, the first model 112, the second model 114, and/or the third model 116 may utilize machine learned techniques to determine the movement of the objects 104 in the environment. In such examples, machine learned algorithms may be trained to determine movement of the objects 104 in an environment based on various input factors, such as environmental factors, weather factors, timing factors, known reactions to particular classes of objects 104 or vehicle(s) in proximity of vehicle 102, or the like.

In various examples, the vehicle computing system may determine a current processing unit usage and/or memory usage and determine whether to perform prediction processing using one or more of the first model 112, the second model 114, and/or the third model 116. In some examples, the vehicle computing system may determine that a processing unit usage and/or memory usage meets or exceeds a threshold and may determine to perform less prediction processing by one or more of the models. In some examples, the vehicle computing system may determine that a processing unit usage and/or memory usage is below a threshold, and based on the threshold being less than the threshold, may determine to perform additional prediction processing (such as, in order to identify finer levels of behavior prediction). In some examples, the vehicle computing system may determine a current processing unit usage and/or memory usage and determine whether to treat an object differently in future prediction processing based on the processing unit usage and/or memory usage. In such examples, the vehicle computing system may determine that a current processing unit usage and/or memory usage meets or exceeds a threshold value and based on the threshold being met or exceeded, the vehicle computing system may disregard processing one or more of the objects 104 by a model.

Figure 2:
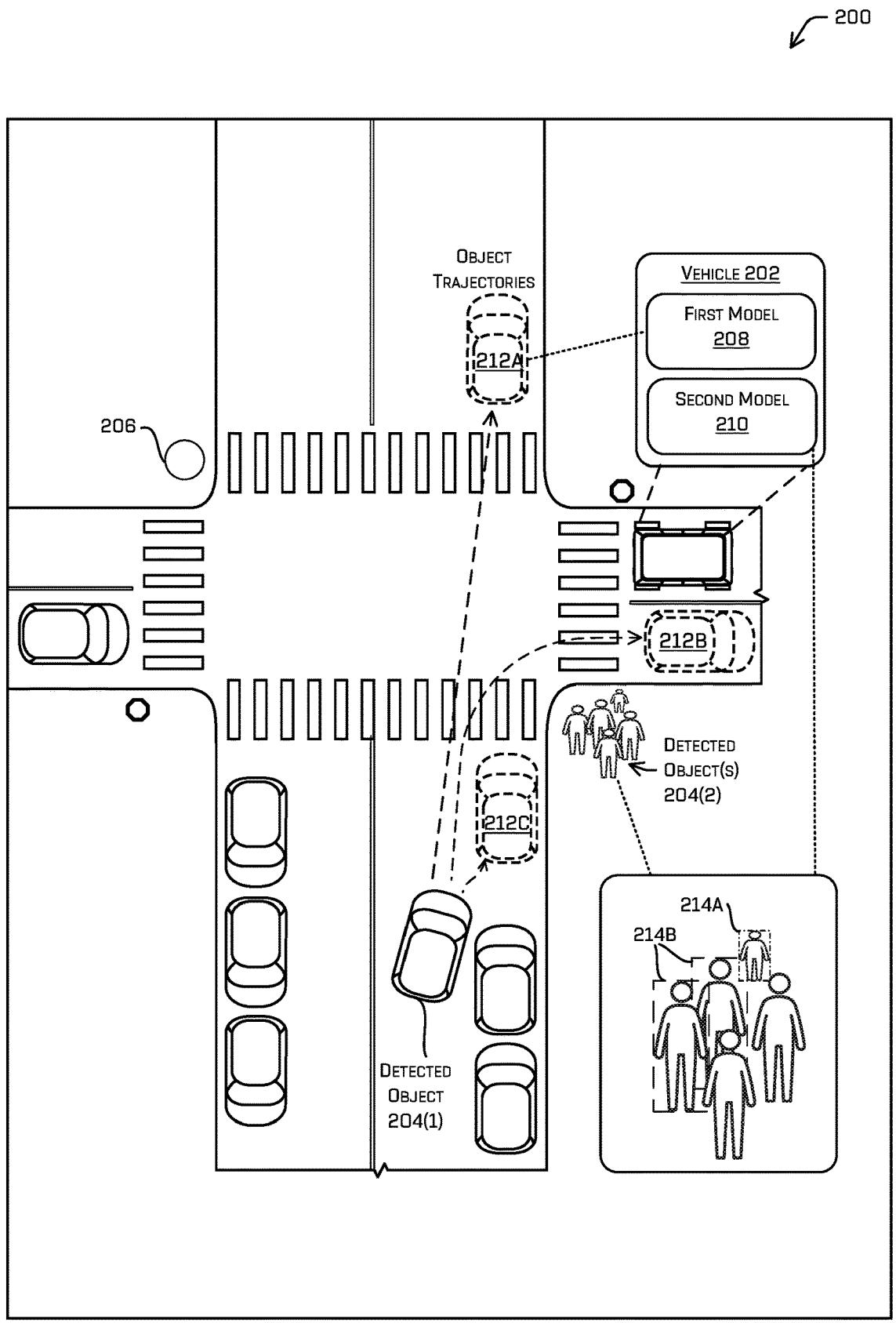
FIG. 2 is an illustration of another example environment, in which an example vehicle applies different models to predict behavior for different objects and/or regions in the environment.

FIG. 2 is an illustration of another example environment 200, in which an example vehicle 202 applies different models to predict behavior for different objects and/or regions in the environment. A vehicle computing system may implement the behavior prediction model of the vehicle 202. While described as a separate model, in some examples, the behavior prediction techniques described herein may be implemented by other vehicle systems, components, and/or computing devices. For example, and as will be described in further detail with regard to FIG. 4, the behavior prediction techniques described herein may be implemented at least partially by or in association with a model component 430 and/or a planning component 424.

In various examples, the vehicle computing system may be configured to predict behavior of one or more objects 204 in the environment 200, such as via a perception component (e.g., perception component 422) and/or the model component 430. The vehicle computing system may detect the object(s) 204 based on sensor data received from one or more sensors. In some examples, the sensor(s) may include sensors mounted on the vehicle 202, and include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors 206 mounted in the environment 200.

In various examples, vehicle 202 may be configured to transmit and/or receive data from other autonomous vehicles and/or the sensors 206. The data may include sensor data, such as data regarding objects 204 detected in the environment 200. In various examples, the vehicle computing system may receive the sensor data and may determine a type of object 204 (e.g., classify the type of object), such as, for example, whether the object 204 is a car, such as object 204(1), a truck, motorcycle, moped, bicyclist, pedestrian, such as object 204(2), or the like.

In various examples, the vehicle 202 may include a first model 208 and a second model 210 usable for predicting behavior of one or more objects 204. The first model 208 and second model 210 may predict behavior in a variety of ways by implementing different computations and/or classifiers specific to each model that enable different levels (e.g., low, normal, heightened) of processing during behavior prediction. Sensor data representing the detected objects 204 may be input into one or more of the first model 208 and the second model 210 to predict behavior of objects in the environment.

In some examples, the first model 208 may predict behavior (e.g., object trajectories 212A, 212B, and/or 212C, etc.) of the detected object 204(1) within the environment 200 by employing different detections techniques such as a movement detector. Each of the predicted object trajectories 212A, 212B, and/or 212C by the first model 208 may affect operation of the vehicle 202 in different ways. For instance, object trajectory 212A may impact the vehicle 202 more (e.g., have a higher likelihood of intersecting the vehicle 202) than object trajectories 212B or 212C (e.g., trajectories that do not anticipate crossing paths with the vehicle). In some examples, the first model 208 may employ more detailed levels of movement detection following the initial detection of the object 204(1). By employing more detailed levels of movement detection, the first model 208 may make improved predictions regarding the likelihood that the object 204(1) will take one of the trajectories 212A, 212B, or 212C. In some examples, more attention may be focused by the first model 208 on a steering angle of the front wheels of the vehicle 204(1) to update which of the trajectories (212A, 212B, and/or 212C) the vehicle 204(1) is most likely to take. Based on the predictions from the first model 208, the vehicle computing system of the vehicle 202 may determine that the vehicle 204(1) is pulling over to park (e.g., object trajectory 212C). By processing models that take into consideration additional details of each predicted behavior (e.g., object trajectories, etc.), a model may predict behavior most likely to occur by an object from among a group of likely behaviors (e.g., identifying the most likely trajectory by the object is improved).

Models may detect multiples objects and process the multiple objects as a single entity during prediction processing. In various examples, the second model 114 may detect objects 204(2) as a group of pedestrians and predict behavior of the group of pedestrians (e.g., a potential action of the group) as a collective entity. In various examples, processing groups of objects as a collective entity saves processing resources (e.g., memory resources and/or processing resources) as compared to applying separate processing resources to process each object in the group of objects. In this way, additional processing resources may be available to the model, or other models, for performing predictions that would otherwise limit an amount of processing that may be performed by one or more of the models.

In some examples, the second model 210 may predict behavior (e.g., potential actions) of detected objects 204(2) (a group of pedestrians) within the environment 200. Upon detecting the group of pedestrians, the second model 210 may identify pedestrians on the edge of the group (e.g., a perimeter) that are most likely to enter the roadway (e.g., and potentially impact operation of the vehicle 202). In some examples, the second model 210 may further classify the pedestrians in the group, such as classifying object 214A as a child and classifying objects 214B as adults. In some examples, the second model 210 may classify the detected objects 204(2) using machine learned model(s) that classify the objects 204(2) (e.g., age, sex, velocity). In some examples, predictions made by the second model 210 in relation to object 214A (e.g., a child) may be more detailed than the predictions for objects 214B (e.g., heightened movement detection). Focusing on the edge of the group of pedestrians 204(2) saves computational resources that would otherwise be used to predict behavior of all the pedestrians in the group, thereby making further computational resources available to the second model 210 to make behavior predictions.

The second model 210 may be determined in a variety of ways. In some examples, a determination of the second model 210 is based on a context of the objects 204 (e.g., movement of an object relative to other objects). For instance, a determination of the second model 210 may be based on an object behaving abnormally in relation to another object(s) (e.g., behavior of object 214A is anomalous compared to the behavior of objects 214B). In some examples, after the second model 210 classifies objects 204(2) as pedestrians, the second model 210 may employ anomaly detection to predict whether object 214A (e.g., a child) is behaving differently than objects 214B. In some examples, the second model 210 may employ different computations (e.g., different detection techniques, higher resolutions, more network layers in a neural network, etc.) to make more detailed predictions about the behavior of the child to gain more insight about whether irregular movement of the anomalous object (the child) is likely to intersect with the vehicle (e.g., enter the roadway). In some examples, the second model 210 may limit or cease processing the objects 214B to ensure computational resources are available to predict behavior of the child (object 214A).

In various examples, the vehicle computing system may determine the actions that the vehicle 202 may take in the environment 200. In various examples, a vehicle computing system may determine one or more predicted object trajectories (e.g., object trajectories 212A, 212B, and/or 212C, etc.) based on the predictions from the first model 208 and/or the second model 210. In some examples, the trajectories may include any number of potential paths in which the objects 204 may travel from a current position (e.g., at the time of perception) and/or based on a direction of travel.

In some examples, predictions by the first model 208 and/or the second model 210 associated with objects 204 may be based on active prediction. Active prediction includes determining potential and/or likely reactions the objects 204 may have based on a potential action of vehicle 202. Using the example from above, the vehicle computing system may determine that the object 204(1) may accelerate or remain stopped based on the vehicle 202 approaching the intersection. Accordingly, the vehicle computing system may determine one or more predictions (via the first model 208 and/or the second model 210) associated with the object 204(1) based on a reaction to the vehicle 202.

In some examples, the first model 208 may be configured to perform passive prediction, while the second model 210 may be configured to perform active prediction. For instance, the vehicle 202 may be configured to use a first, passive prediction model for certain objects (e.g., objects classified as a first object type, objects more than a threshold distance away from the vehicle, etc.) and to use a second, active prediction model for other objects (e.g., objects classified as a second object type, objects within the threshold distance from the vehicle, etc.).

In various examples, the predictions by the first model 208 and/or the second model 210 may be determined utilizing one or more machine learning algorithms. In such examples, the vehicle computing system, such as via the first model 208 and/or the second model 210 may receive the sensor data associated with the object(s) 204 and predict a behavior of the object(s) 204 based on the sensor data. For example, the vehicle computing system may be trained on captured image data of the object(s) 204 motion over time such that the vehicle computing system may recognize behavior that may suggest future actions (e.g., trajectories) the object(s) 204 may take. Additionally, or in the alternative, the vehicle computing system may utilize heat maps, tree search methods, and/or temporal logic formulas to determine one or more trajectories of the object(s) 204.

Figure 3:
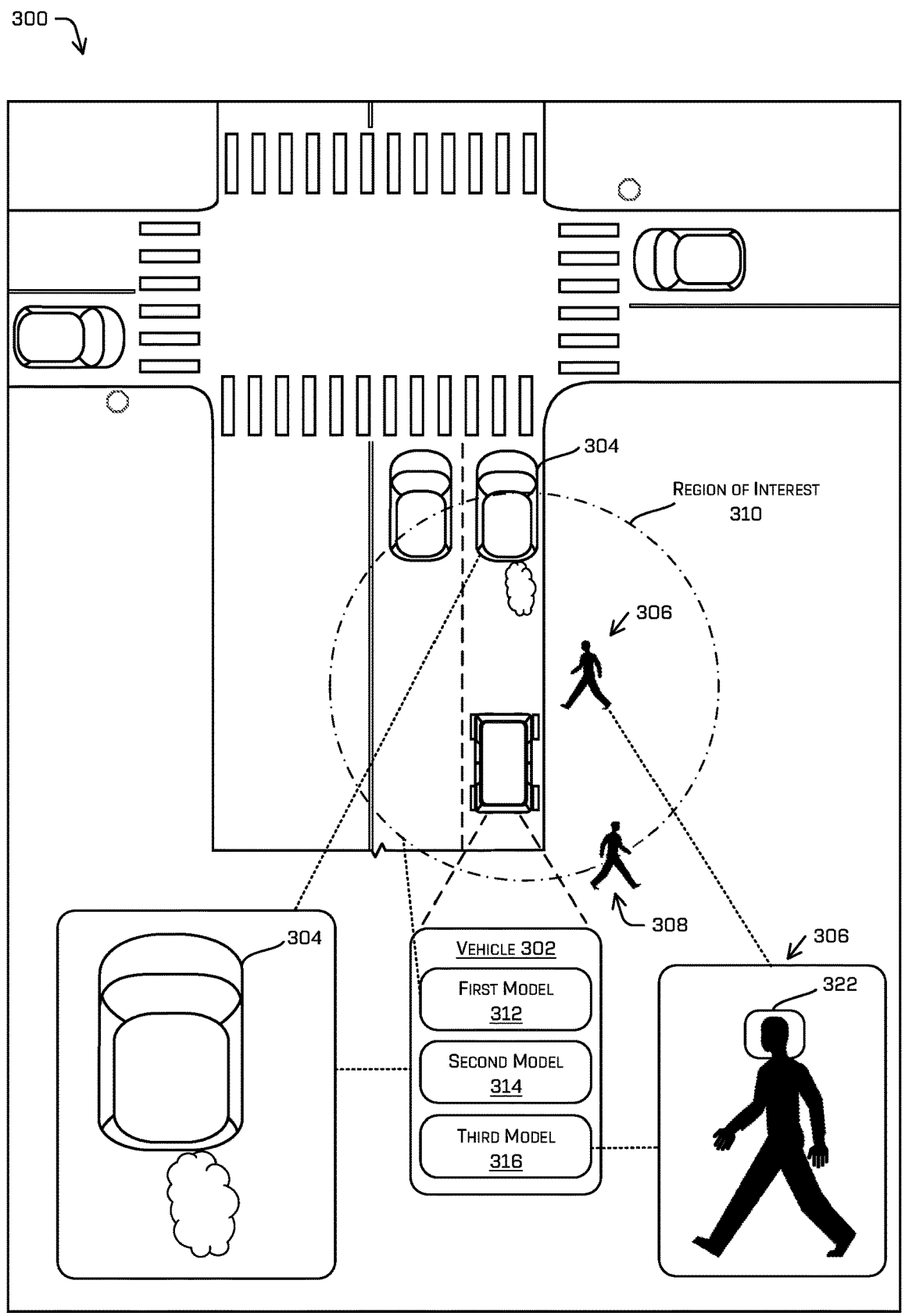
FIG. 3 is an illustration of another example environment, in which an example vehicle applies different models to predict behavior for different objects and/or regions in the environment.

FIG. 3 is an illustration of another example environment 300, in which an example vehicle 302 applies different models to predict behavior for different objects and/or regions in the environment. A vehicle computing system may implement the behavior prediction model of the vehicle 302. While described as a separate model, in some examples, the behavior prediction techniques described herein may be implemented by other vehicle systems, components, and/or computing devices. For example, and as will be described in further detail with regard to FIG. 4, the behavior prediction techniques described herein may be implemented at least partially by or in association with a model component 430 and/or a planning component 424.

In various examples, the vehicle computing system may be configured to predict behavior of one or more objects 304, 306, and 308 in the environment 300, such as via a perception component (e.g., perception component 422). The vehicle computing system may detect the object(s) 304, 306, and 308 based on sensor data received from one or more sensors. In some examples, the sensor(s) may include sensors mounted on the vehicle 302, and may include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like. In some examples, the sensor(s) may include one or more remote sensors, such as, for example sensors mounted on another autonomous vehicle, and/or sensors mounted in the environment 300.

In various examples, the vehicle computing system may determine a region of interest 310 based on sensor data received from one or more sensors and/or map data available to a planning component of the vehicle 302. The region of interest may be determined based at least in part on a region being near the vehicle (e.g., a threshold distance), a region that includes a planned path of the vehicle, a region in which the vehicle is likely to interact with an object, a region with unknown objects, and so on.

As shown in FIG. 3, the first model 312 may employ a variety of behavior prediction techniques within the region of interest 310. In some examples, the region of the interest 310 may vary in size and shape to correspond to areas around the vehicle 302 that may benefit from different levels of prediction processing. As illustrated in FIG. 3, the first model 312 may detect objects 304, 306, and 308 within the region of interest 310 and classify each detected object. A classification may include another vehicle (e.g., car (object 304), a pick-up truck, a semi-trailer truck, a tractor, a bus, a train, etc.), a pedestrian (objects 306 and 308), a bicyclist, an equestrian, or the like. In some examples, the first model 312 may run gesture recognition for all objects within the region of interest 310 (within a threshold distance of the vehicle 302). In some examples, processing by the first model 312 may be more extensive or sophisticated and processing performed by models outside of the region of interest 310.

Additionally, or in the alternative, a model may be determined for one or more objects (304, 306, and/or 308) based on a semantic classification of the object determined by the first model 312. For instance, the second model 314 may predict behavior relating to object 304 (a vehicle) while the third model 316 may predict behavior relating to object 306 (a pedestrian). In some examples, the second model 314 and/or the third model 316 may be configured to run specific behavior detection techniques based on a combination of features associated with detected objects 304 and/or 306, and/or the environment. In some examples, the features may include one or more of a likelihood of the object impacting operation of the vehicle (e.g., likelihood that the object intersects with the vehicle in the environment), a semantic classification of the object (e.g., an object class or type), an attribute of the object, an attribute of the environment, a proximity of the object relative to the vehicle, an attribute of the vehicle relative to another object, a location of the object, a velocity of the object relative to a velocity of the vehicle, a route of the vehicle to a destination in the environment, a region adjacent to a vehicle, interaction between an object and a vehicle, or an interaction between objects in the environment. In some examples, the first model 312 may identify attributes of detected objects (exhaust clouds from object 304) to determine one or more additional models for use within the region of interest 310. In some examples the first model 312 may determine a direction of travel of an object (pedestrian 306 facing the vehicle 302 and/or pedestrian 308 facing away from the vehicle 302), a location of an object, and/or an interaction an object and the vehicle 302. A vehicle computing system may use these determinations by the first model 312 as a basis for determining the second model 314 and/or the third model 316 for use in predicting behavior of objects 306 and 308, respectively.

As shown in FIG. 3, based on one or more of the features noted above (e.g., exhaust clouds from object 304), the second model 314 is determined for the object 304 to employ further prediction techniques than those performed by the first model 312. The additional techniques used by the second model 314 may include, for example, detecting attributes of the object 304 pertaining to an overall condition (vehicle is dirty, has dents, a dirty window limiting a driver's field of vision, etc.). The additional techniques used by the second model 314 may also or instead include identifying and/or detecting 'small objects' on or next to the object 304. In such examples, the second model 314 may detect identifying characteristics of the object 304 (e.g., a sticker indicating the vehicle 304 is a ride-share vehicle and more likely to pull over for a pedestrian). In some examples, behavior prediction output by the second model 314 may be used by the vehicle computing system to cause the vehicle 302 to change lanes (to avoid the vehicle 304), although a number of other actions are also contemplated.

In various examples, the second model 314 may output a determination of a driver's attention (of object 304) by using gaze detection and/or gesture detection to determine if a driver is watching the road or otherwise paying attention while driving. Additionally or alternatively, the second model 314 may detect movements by the object 304 (vehicle) to determine an attention rating for the object (operating safely, staying in lane, etc.). In such examples, a planning component of the vehicle 302 can use behavior predictions (attention determinations) from the second model 314 to avoid a driver with poor driving habits and/or follow a driver with good driving habits. In this way, operation of the vehicle 302 is improved by being directed to areas in the environment occupied by more attentive objects that have a higher likelihood for safety than areas with objects having lower attention determinations.

The third model 316 may be employed to perform at least some different behavior prediction processing from the first model 312 and the second model 314. In some examples, the third model 316 may employ identity recognition 322 (e.g., face recognition) to predict whether the pedestrian 306 is a potential rider waiting for a pickup from the vehicle 302. In some examples, the identity recognition 322 employed by the third model 316 may allow the pedestrian (rider) to be identified from among a group of pedestrians thereby improving operation of the vehicle 302 (e.g., pulls up to the pedestrian more efficiently and safely). In some examples, the vehicle 302 may employ identity recognition 322 by the third model 316 responsive to receiving a signal from a computing device of the pedestrian (a device used to request the vehicle 302).

As noted above, the first model 312 may detect that the pedestrian 308 is located behind the vehicle 302 and moving in a direction away from the vehicle 302 (behind the vehicle). In some examples, the vehicle 302 may provide a less intensive model to model behavior of the pedestrian 308 behind the vehicle 302 since it is less relevant. By varying levels of behavior detection according to different models, predictions made by the first model 312, the second model 314, and/or the third model 316 may be improved due to additional processing being dedicated towards objects most relevant to a vehicle (e.g., vehicle 302).

In some examples, heightened planning may be initiated by a planning component of a vehicle computing system by implementing models that process additional characteristics of objects in the region of interest 310. For instance, sensors of the vehicle may identify a region having a low confidence level for whether the objects within the region will impact safe operation of the vehicle. In these instances, a model can implement additional processing techniques that may predict which objects will intersect with or otherwise effect the vehicle en route to a destination. In some examples, a model may perform finer levels of behavior prediction processing when the vehicle identifies a low visibility region (e.g., a horizon, an occluded region). In these examples, the model may make a prediction for an object by using detection techniques that look through a window of a car and/or windows of a building to gain more detail about a likely path the object may take in the future. In some examples, a route previously navigated by a vehicle may employ models at a region(s) known by the vehicle to benefit from additional prediction processing (e.g., intersections, crosswalks, areas of large numbers of pedestrians, etc.). In these examples, routes may be known to require additional processing based on other vehicles having travelled through the area (e.g., a vehicle in a fleet of autonomous vehicles sharing sensor data with a remote location that may coordinate vehicle actions, or sharing sensor data directly to the vehicle). Regardless of how known, regions that historically involved heightened levels of prediction processing by models may be assigned a model by a planning component of a vehicle computing system ahead of encountering the regions. In some examples, models may be 'taught' how to perform predictions for these regions by utilizing machine learning techniques that learn from previous predictions of the models.

Figure 4:
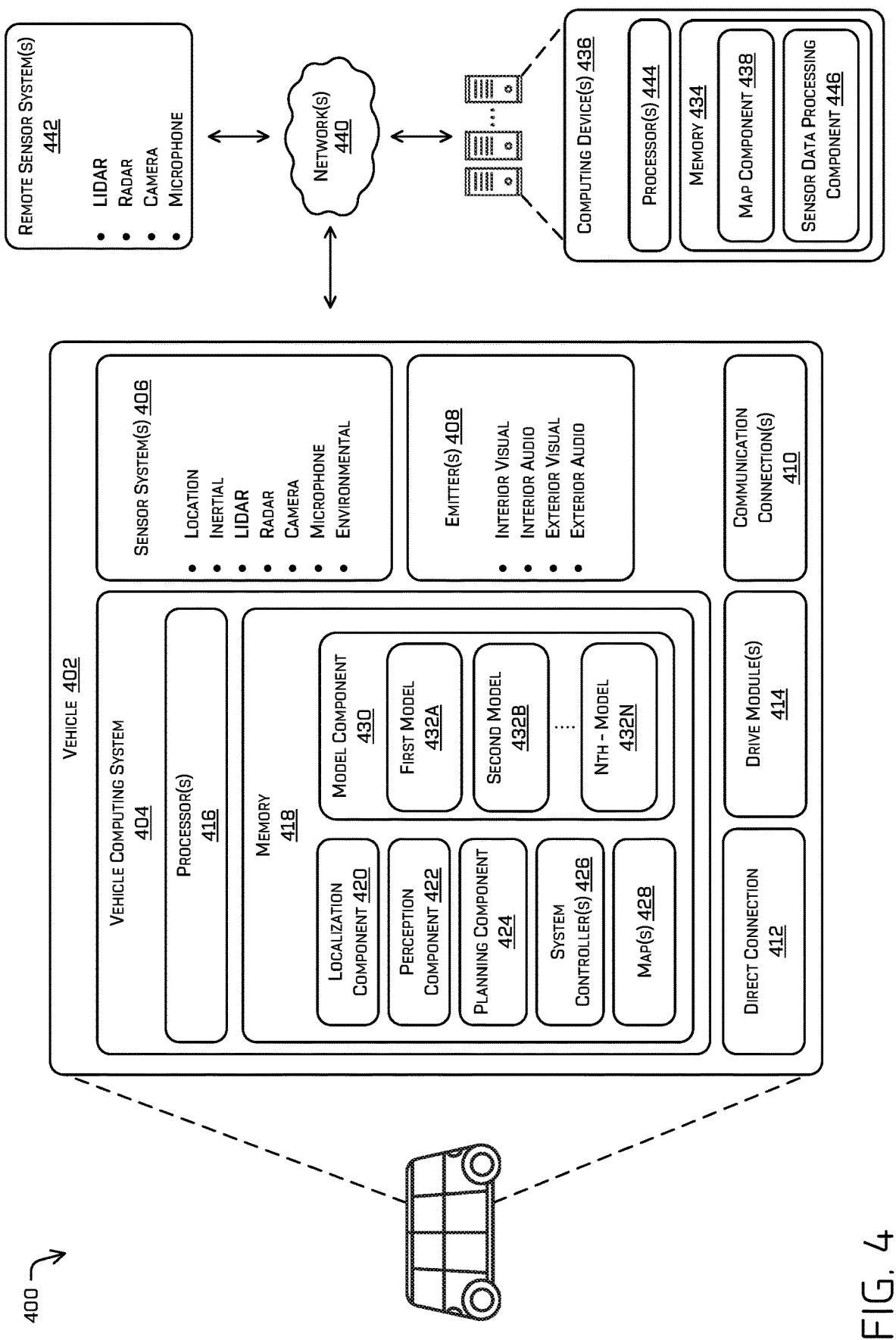
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing system 404, one or more sensor systems 406, one or more emitters 408, one or more communication connections 410, at least one direct connection 412, and one or more drive modules 414.

The vehicle computing system 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing system 404 stores a localization component 420, a perception component 422, a planning component 424, one or more system controllers 426, one or more maps 428, and a model component 430 including one or more models, such as a first model 432A, a second model 432B, up to an Nth model 432N (collectively "models 432"), where N can be any integer greater than 1. Though depicted in FIG. 4 as residing in the memory 418 for illustrative purposes, it is contemplated that the localization component 420, a perception component 422, a planning component 424, one or more system controllers 426, one or more maps 428, and/or a model component 430 including the models 432 may additionally, or alternatively, be accessible to the vehicle 402 (e.g., stored on, or otherwise accessible by, memory remote from the vehicle 402, such as, for example, on memory 434 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428 and/or map component 438, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., objects) in an environment. For example, a prediction component may generate one or more predicted trajectories for objects within a threshold distance from the vehicle 402. In some examples, a prediction component may measure a trace of an object and generate a trajectory for the object based on observed and predicted behavior.

In at least one example, the vehicle computing system 404 may include one or more system controllers 426, which may be configured to control steering, propulsion, braking, safety, emitters, communication, and other systems of the vehicle 402. The system controller(s) 426 may communicate with and/or control corresponding systems of the drive module(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect objects in an environment, generate routes, determine actions and/or trajectories to navigate within an environment.

In some examples, the one or more maps 428 may be stored on a remote computing device(s) (such as the computing device(s) 436) accessible via network(s) 440. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As illustrated in FIG. 4, the vehicle computing system 404 may include a model component 430. The model component 430 may be configured to predict behavior of one or more objects, such as objects 104 of FIG. 1, to the vehicle 402. In various examples, the model component 430 may receive one or more features associated with the detected object(s) from the perception component 422 and/or from the sensor system(s) 406. In some examples, the model component 430 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 430 could be part of the planning component 424 or other component(s) of the vehicle 402.

In various examples, the model component 430 may send predictions from the first model 432A, the second model 432B, and/or the Nth model 432N that are used by the planning component 424 to generate one or more predicted trajectories of the object (e.g., direction of travel, speed, etc.), such as from the prediction component thereof. In some examples, the planning component 424 may determine one or more actions (e.g., reference actions and/or sub-actions) for the vehicle 402. In some examples, the model component 430 may be configured to determine behavior of detected objects based at least in part on the one or more actions for the vehicle 402. In some examples, the model component 430 may be configured to determine the actions that are applicable to the environment, such as based on environment characteristics, weather characteristics, or the like.

Models included in the model component 430 may perform different levels of prediction processing depending upon computational resource(s), algorithm(s), and/or classifier(s) associated with a model. In some examples, the first model 432A, the second model 432B, and/or the Nth model 432N may define different computational resources, classifiers, and/or algorithms that correspond to different levels of detection (e.g., gesture recognition, head detection, movement detection, and the like) and/or different levels of processing (e.g., a computational time, allocation of memory or processors, number of potential trajectories to simulate, etc.). By processing a model to predict behavior of an object using different computational resources, algorithms, and/or classifiers, the model may provide predictions that improve safe operation of the vehicle by capturing behavior of the object with different levels of detail.

In various examples, the model component 430 may be configured to determine an initial relevance of detected objects in the environment. In various examples, the model component 430 may utilize machine learning techniques to determine the initial relevance of detected objects. In such examples, machine learning algorithms may be trained to determine whether an object is relevant to a vehicle in the environment. The initial relevance may be based on a possibility that the detected object may occupy the same space as the vehicle 402 over a time period (e.g., within a threshold distance of a path of the vehicle 402). In various examples, the initial relevance may be based on one or more rules. As discussed above, the rule(s) may be determined using machine learning techniques. In various examples, the rules component 432 may be configured to determine the rule(s) to apply to an initial relevance determination. The rule(s) may be based on semantic data and/or geometric data associated with the object. In at least one example, a set of rules applied to a detected object to determine the initial relevance therewith may be based on a classification of the object, a distance (e.g., threshold distance) between the detected object and the vehicle 402, an absolute location of the object, a relative position of the object, and respective directions of travel associated with the detected object and the vehicle 402.

The model component 430 may generate sets of estimated states of the vehicle and one or more detected objects forward in the environment over a time period. The model component 430 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects determined to be relevant to the vehicle at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the model component 430 may utilize machine learning, linear temporal logic, tree search methods, heat maps, and/or other techniques for determining predicted trajectories and/or estimated positions of objects.

In various examples, the estimated states may be generated periodically throughout the time period. For example, the model component 430 may generate estimated states at 0.1 second intervals throughout the time period. For another example, the model component 430 may generate estimated states at 0.05 second intervals. The estimated states may be used by the planning component 424 in determining an action for the vehicle 402 to take in an environment.

The model component 430 may be configured to verify the relevance of each object included in a set of estimated states (e.g., detected object, initially determined relevant object, etc.). In various examples, the model component 430 may perform relevance verifications randomly and/or periodically throughout the time period to determine continued relevance of an object to the vehicle, including every iteration and/or as needed to free up computational resources. As discussed above, the relevance verification(s) may include a determination that an object previously determined to be relevant to the vehicle 402 will remain relevant to the vehicle at a time in the future (e.g., may occupy the same space as the vehicle 402 during the time period associated with the set of estimated states). In some examples, the relevance verification(s) may be performed substantially concurrently with one or more estimated states of the set of estimated states. In some examples, the relevance verification(s) may be performed using data (e.g., estimated positions, etc.) associated with an estimated state. The relevance verification(s) may be based on geometric data (e.g., distance, angle, direction of travel, velocity, acceleration, trajectory, etc.), semantic data (e.g., classification of the object), or a combination thereof. In various examples, the model component 430 may compare an estimated position of the vehicle 402 in an estimated state to an estimated position of an object in the estimated state.

In various examples, the model component 430 may utilize machine learned techniques to predict behavior of a detected object(s). In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model (either binary or having some relative indication of relevance).

In some examples, the model component 430 may determine a model to use to predict object behavior based on one or more features. In some examples, the features may include one or more of a likelihood of the object impacting operation of the vehicle (e.g., likelihood that the object intersects with the vehicle in the environment), a semantic classification of the object (e.g., an object class or type), an attribute of the object, an attribute of the environment, a proximity of the object relative to the vehicle, a location of the object, a velocity of the object relative to a velocity of the vehicle, a route of the vehicle to a destination in the environment, a region adjacent to a vehicle, interaction between an object and a vehicle, or an interaction between objects in the environment, just to name a few.

In some examples, models may provide more behavior prediction processing for more relevant objects, and less behavior prediction processing for models associated with less relevant objects. Thus, the models direct available computational resources to the most relevant objects during vehicle planning thereby improving vehicle safety as the vehicle navigates in the environment. In addition, by dedicating less computational resources to less relevant objects, models have more computational resources available to make in depth behavior predictions on the most relevant objects.

By removing the data associated with irrelevant objects from future predictions, the model component 430 may increase an amount of memory and processing power available to the vehicle computing system 404 for other calculations, programs, applications, etc. In some examples, the removal of data associated with the irrelevant object may increase processing speed related to predicting behavior corresponding to other objects in the environment. Accordingly, the techniques described herein may improve the functioning of the vehicle computing system.

As can be understood, the components discussed herein (e.g., the localization component 420, the perception component 422, the planning component 424, the one or more system controllers 426, the one or more maps 428, the relevance determination component 530 including the rules component 432 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 434, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing system 404. Additionally, or in the alternative, the sensor system(s) 406 may send sensor data, via the one or more networks 440, to the one or more computing device(s) 436 at a particular frequency, after a lapse of a predetermined period of time, in near real-time, etc.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive module(s) 414. Also, the communication connection(s) 410 may allow the vehicle to communicate with other nearby computing device(s) (e.g., remote computing device 436, other nearby vehicles, etc.) and/or one or more remote sensor system(s) 442 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing system 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive modules 414. In some examples, the vehicle 402 may have a single drive module 414. In at least one example, if the vehicle 402 has multiple drive modules 414, individual drive modules 414 may be positioned on opposite ends of the vehicle 402 (e.g., the front and the rear, etc.). In at least one example, the drive module(s) 414 may include one or more sensor systems to detect conditions of the drive module(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 414. In some cases, the sensor system(s) on the drive module(s) 414 may overlap or supplement corresponding systems of the vehicle 402 (e.g., sensor system(s) 406).

The drive module(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 414. Furthermore, the drive module(s) 414 may also include one or more communication connection(s) that enable communication by the respective drive module with one or more other local or remote computing device(s).

In at least one example, the direct connection 412 may provide a physical interface to couple the one or more drive module(s) 414 with the body of the vehicle 402. For example, the direct connection 412 may allow the transfer of energy, fluids, air, data, etc. between the drive module(s) 414 and the vehicle. In some instances, the direct connection 412 may further releasably secure the drive module(s) 414 to the body of the vehicle 402.

In at least one example, the localization component 420, the perception component 422, the planning component 424, the one or more system controllers 426, the one or more maps 428, and the model component 430, may process sensor data, as described above, and may send their respective outputs, over the one or more network(s) 440, to the computing device(s) 436. In at least one example, the localization component 420, the perception component 422, the planning component 424, the one or more system controllers 426, the one or more maps 428, and the model component 430 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 440. In some examples, the vehicle 402 may receive sensor data from the computing device(s) 436 and/or remote sensor system(s) 442 via the network(s) 440. The sensor data may include raw sensor data and/or processed sensor data and/or representations of sensor data. In some examples, the sensor data (raw or processed) may be sent and/or received as one or more log files.

The computing device(s) 436 may include processor(s) 444 and a memory 434 storing the map component 338 and a sensor data processing component 446. In some examples, the map component 338 may include functionality to generate maps of various resolutions. In such examples, the map component 338 may send one or more maps to the vehicle computing system 404 for navigational purposes. In various examples, the sensor data processing component 446 may be configured to receive data from one or more remote sensors, such as sensor system(s) 406 and/or remote sensor system(s) 442. In some examples, the sensor data processing component 446 may be configured to process the data and send processed sensor data to the vehicle computing system 404, such as for use by the model component 430 (e.g., the first model 432A, the second model 432B, and/or the Nth model 432N. In some examples, the sensor data processing component 446 may be configured to send raw sensor data to the vehicle computing system 404.

The processor(s) 416 of the vehicle 402 and the processor(s) 444 of the computing device(s) 436 may be any suitable processor capable of executing instructions to process data and perform operations as described herein. By way of example and not limitation, the processor(s) 416 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 434 are examples of non-transitory computer-readable media. The memory 418 and memory 434 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and memory 434 may include at least a working memory and a storage memory. For example, the working memory may be a high-speed memory of limited capacity (e.g., cache memory) that is used for storing data to be operated on by the processor(s) 416 and 444. In some instances, the memory 418 and memory 434 may include a storage memory that may be a lower-speed memory of relatively large capacity that is used for long-term storage of data. In some cases, the processor(s) 416 and 444 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
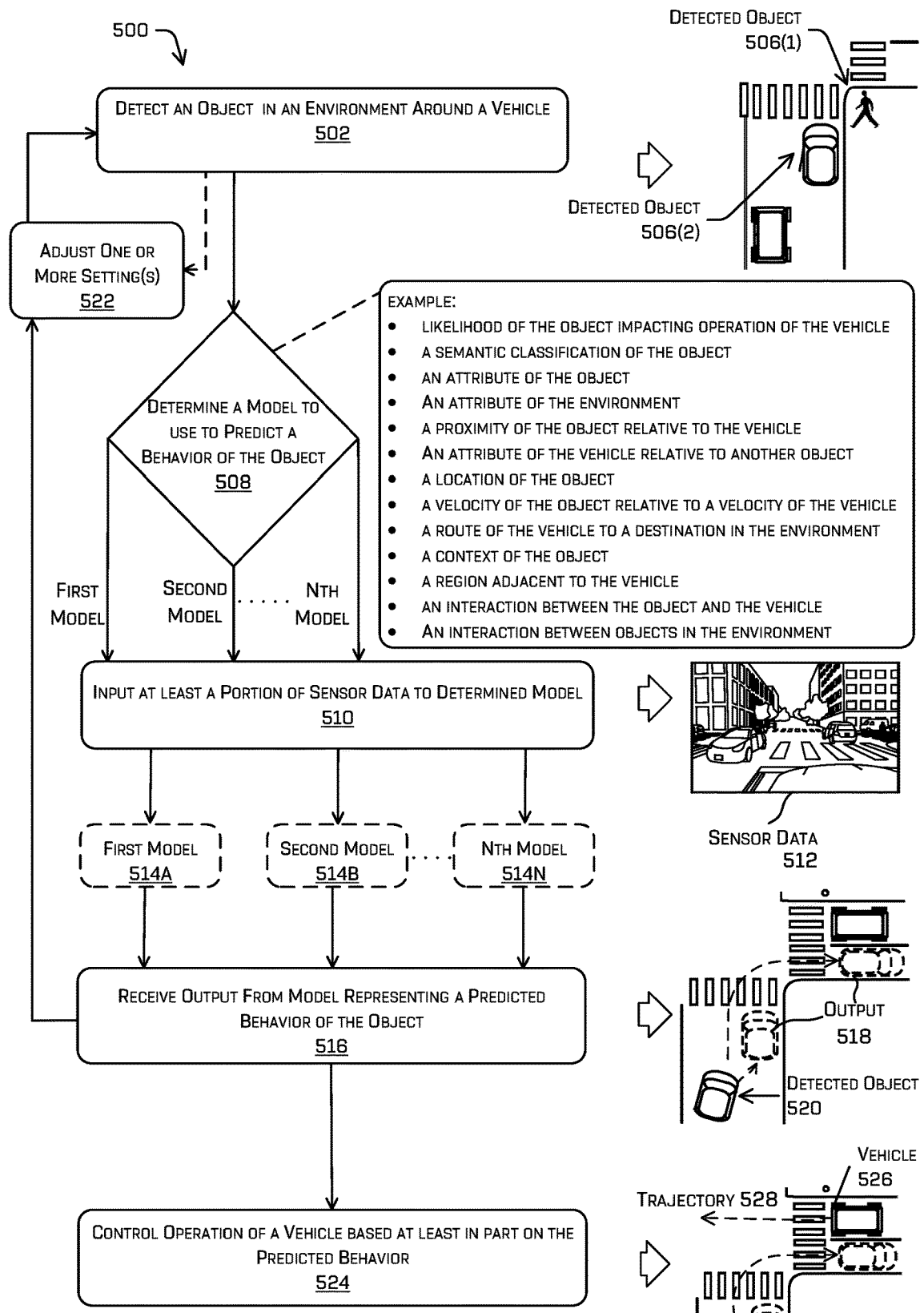
FIG. 5 is a flowchart depicting an example process for predicting behavior of objects using different models.

FIGS. 5 and 6 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 is a flowchart depicting an example process 500 for predicting behavior of objects using different models. Some or all of the process 500 may be performed by one or more components in FIG. 4, as described herein. For example, some or all of process 500 may be performed by the vehicle computing system 404.

At operation 502, the process may include detecting an object in an environment around a vehicle. The vehicle computing system may be configured to detect an object based on sensor data. The sensor data may be received from one or more sensors on the vehicle and/or from one or more remote sensors. In some examples, the vehicle computing system may be configured to detect dynamic objects (objects 506(1) and 506(2)) and/or static objects and combine the associated sensor data with map data. In some examples, the map data may represent fixed features of an environment including but not limited to crosswalks, traffic signals, school zones, and the like. In some examples, objects may be detected utilizing one or more heat maps. In various examples, the objects may be detected utilizing machine learned techniques. In such examples, one or more machine learned algorithms may be trained to detect objects based on sensor data. In some examples, the objects may be detected utilizing temporal logic, and/or tree search methods.

At operation 504, the process may include determining a likelihood that the object will impact operation of the vehicle (e.g., potential for an accident). In some examples, the likelihood that the object will impact operation of the vehicle may indicative of objects that are relevant to the vehicle. An object may be relevant to the vehicle if the object and the vehicle could potentially occupy the same space or come within a threshold distance of one another over a period of time (e.g., potential for an accident). Additionally, or in the alternative, an object may be relevant to the vehicle if the object is within a region of interest identified by the vehicle. For example, a determination of relevance may be based on a location of an object relative to the vehicle, a trajectory of the object (e.g., direct, speed, acceleration, etc.), a type of object (e.g., car, truck, motorcycle, pedestrian, etc.), an object's proximity to a region of interest, or the like. For example, at a first time, a pedestrian may be located near a crosswalk and may be determined to be relevant to the vehicle. Accordingly, the pedestrian may be taken into account in operations (e.g., simulations, estimated states, interaction modeling, collision estimation, etc.) or other vehicle control planning operation at the first time. At a second time, the pedestrian may continue walking past the crosswalk and may therefore be determined to no longer be relevant to the vehicle. Based on a determination that an object is relevant to the vehicle, the object may undergo specific processing (e.g., gesture recognition to detect hand signals or body language of the pedestrian or gaze detection to detect whether the eyes of the pedestrian are looking towards the crosswalk, etc.) to heighten the predicted behavior of the pedestrian. Based on a determination that an object is irrelevant to the vehicle, the object may be disregarded in at least some future operations (e.g., estimated states of the vehicle and/or object) by the models and/or other vehicle control planning considerations. For the purposes of this discussion, operations such as a simulation and/or an estimated state may include predicted locations of a vehicle and one or more objects at a particular time in the future (e.g., time after a current/initial time). Additional examples of determining relevance of an object are described in U.S. patent application Ser. No. 16/530,515, filed on Aug. 2, 2019, entitled "Relevant Object Detection," Ser. No. 16/417,260, filed on May 30, 2019, entitled "Object Relevance Determination," and Ser. No. 16/389,720, filed on May 6, 2019, entitled "Dynamic Object Relevance Determination," all of which are incorporated herein by reference.

At operation 508, the process may include determining a model to use to predict a behavior of an object (e.g., the first model 514A, the second model 514B, and/or the Nth model 514N). The predicted behavior by a model may represent future positions of the object and the vehicle over a time period. The predicted behavior (e.g., plurality of estimated states) may be generated randomly and/or periodically throughout the time period. For example, prediction may be generated every 0.1 seconds throughout the time period.

Determining a model to use to predict a behavior of an object may be based on determining one or more features of an object and/a region. Generally, the one or more features may represent relevance of the object and/or region. In some examples, the feature(s) may include some or all of the following: a likelihood of the object impacting operation of a vehicle (e.g., likelihood that the object intersects with the vehicle in the environment), a semantic classification of the object (e.g., a type of object), an attribute of the object (e.g., historical velocity, historical movement, size, etc.), an attribute of the environment (e.g., weather, map data), a proximity of the object relative to the vehicle (e.g., objects closer to the vehicle may be applied to models that perform more processing than models applied to objects further form the vehicle), an attribute of the vehicle relative to another object (e.g., vehicle orientation), a location of the object (e.g., objects near crosswalks or parked cars, and so on), a velocity of the object relative to a velocity of the vehicle (e.g., faster moving objects may be associated with a model that performs more processing than a slower moving object), a route of the vehicle to a destination in the environment (e.g., previous vehicle missions may identify intersections where more processing or less processing by a model may be desirable), a context of an object (e.g., movement of an object relative to other objects, behavior of the object in the environment, a position and/or orientation of the object relative to an identifier in a map (stop sign, traffic light, crosswalk, lane, building, intersection, etc.), a region adjacent to a vehicle (e.g., models may employ 'small-object' recognition to detect details of objects at a finer scale than previously captured within a threshold distance of the vehicle), interaction between an object and a vehicle (e.g., gestures received from the object by the vehicle and/or communications directed by the vehicle to the object such as emitting audio), or an interaction between objects in the environment (e.g., a child with a ball, a pedestrian acting abnormally compared to another pedestrian, etc.).

As discussed above, a feature of an object and/or a region may include a likelihood that the object will impact operation of the vehicle (e.g., potential for an accident). In some examples, different models may perform more computations or less computations based on a likelihood that the object (or region) will impact operation of the vehicle. Additionally or alternatively, the one or more features may include a relevance of the object or region to the vehicle. In some examples, objects and regions may be relevant to the vehicle if the object or region could potentially occupy the same space or come within a threshold distance of one another over a period of time (e.g., potential for intersecting or coming in contact). Additionally, or in the alternative, an object may be relevant to the vehicle if the object is within a region of interest identified by the vehicle.

The one or more features may also or instead include a semantic classification of the object. In such examples, a first model may be determined for an object that is a vehicle while a second model may be determined for a pedestrian. In some examples, additional model(s) may be based on additional classifications relating to an object or region.

In some examples, a first model may output at least one of a detection of the object or a classification of the object and a second model may be trained to output at least one of a velocity of the object, a predicted trajectory of the object, a pose of the object, a subclassification of the object, a detection of a portion of the object, a detection of a face, or a detection of a gesture.

As noted above, in various examples, the one or more features may include an attribute of the object. Attributes of an object may include, but not be limited to: a size, shape, height, or feature of the object. In some examples, an attribute of a region may describe visibility within the region (e.g., clear, obscured, unknown, etc.). In various examples, an attribute of an object or region may refer to a level of detectability (e.g., how easy it is to determine with confidence whether a detected object or region exists). In some examples, attributes for an object or region may represent a level of confidence in an accuracy of sensor data input into a particular model.

In some examples, a determination of a model to use to predict behavior of an object may be based on a context of an object. For instance, a determination of the model may be based on an object behaving abnormally in relation to another object(s) (of a same or different type as the object that is behaving abnormally). In one illustrative example, a pedestrian that is moving erratically in the environment (stumbling, changing velocity over short periods of time, and the like) may be assigned to a model that computes more processing to gain more insight into a likely position of the object in the future. In some examples, a model may employ anomaly detection to predict whether an object is behaving differently from other objects. In various examples, anomaly detection may also be used by a model to identify regions that stand out from other regions.

At operation 508, the process may include determining a model to use to predict a behavior of an object and/or region based at least in part on the one or more features. In various examples, determining the model may be performed by a system of a vehicle, such as model component 430 or planning component 424 determining a first model 432A, a second model 432B, and/or an Nth model 432N from among multiple models 432. In some examples, a model may be determined from among multiple available models based at least in part on one or more features described herein.

In some examples, a determination of a model to use to predict behavior of an object may be based on a region adjacent to a vehicle navigating in an environment. In various examples, a model may be determined for an occluded region. In some examples, a model may perform finer levels of behavior prediction processing when the vehicle identifies a low visibility region (e.g., a horizon, an occluded region). In these examples, the model may make a prediction for an object by using detection techniques that take into account sensor data captured through a window of a car and/or windows of a building to gain more detail about a likely path the object may take in the future.

In some examples, a model may be determined for a pedestrian making hand signals or other gestures to a vehicle to identify a meaning of the gestures. In such examples, the model may distinguish between an interaction by the pedestrian that is intended for the vehicle and an interaction by the pedestrian that is not intended for the vehicle (e.g., a pedestrian waving to another person in the environment).

In some examples, a determination of a model may be based on a route previously navigated by a vehicle (e.g., employing a model for a region of the route based at least in part on the vehicle having previously navigated the region). In some examples, a vehicle computing system may use a different (e.g., simpler) model for highway driving where there are fewer objects than for city driving where there are more objects present.

In some examples, a determination of a model may be based on a feature received from a remote vehicle or remote server. For instance, any of the examples herein may be based on sensor data from another vehicle and/or from a remote teleoperations server. In one particular example, a vehicle in a fleet of autonomous vehicles may identify objects and/or regions and share associated data representing the objects and/or regions with other vehicles in the fleet such that any vehicle in the fleet can benefit from map data, sensor data, and/or planning data used by another vehicle in the fleet. In such an example, the sharing of data may enable a vehicle that has not encountered an area in an environment (e.g., intersections, crosswalks, areas of large numbers of pedestrians, corridors, freeways, etc.) to prepare models that use less computations or more computations.

In some examples, a model may be trained to select one or more additional models to use based at least in part on a feature of an object and/or a region. Additionally or alternatively, a model may be trained to select one or more additional models to use based at least in part on one or more signals output from other model(s). For instance, training a model to select another model (or combination of models) may include utilizing one or more machine learned algorithms to process sensor data and/or outputs from one or more models.

Models usable to predict object behavior may perform different levels of prediction processing depending upon computational resource(s), algorithm(s), and/or classifier(s) associated with a model. For example, models may define different computational resources, classifiers, and/or algorithms that correspond to different levels of detection (e.g., gesture recognition, head detection, movement detection, and the like) and/or different levels of processing (e.g., a computational time, allocation of memory or processors, number of potential trajectories to simulate, etc.). By processing a model to predict behavior of an object using different computational resources, algorithms, and/or classifiers, the model may provide predictions that improve safe operation of the vehicle by capturing behavior of the object with different levels of detail.

In some examples, a computational resource defined by a model for use to predict behavior may be representative of a memory resource, a processing resource, and/or a computational time. In some examples, models may define memory resources to use during prediction processing (e.g., memory amount, memory location, memory type, and the like). For instance, more memory may be used by a model that performs finer levels of movement detection (e.g., to identify gestures of a detected pedestrian) as compared to a model that performs coarser levels of movement detection. A vehicle computing system may allocate an amount of memory, a type of memory, and/or a memory location to make the best use of available memory resources to one or more models that predict object behavior. In some examples, models may make use of memory resources that are remote from the vehicle (e.g., a remote server). Detected objects that are determined to have no impact on operation of the vehicle may be associated with a model that performs different prediction processing (e.g., accessing fewer available memory resources) thereby enabling more memory resources to be available to models that correspond to objects having a higher likelihood of impacting operation of the vehicle.

In some examples, a model may define processing resources (e.g., processor amount, processor cycles, processor cores, processor location, processor type, and the like) to use to predict a behavior of the detected object. A vehicle computing system that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) determines an output (e.g., a prediction). For example, some models may predict behavior of an object by processing the object using a GPU while other models may predict behavior of an object using a CPU. In this way, each model may be defined to utilize the processing resources that enable the model to perform predictions in the least amount of time (e.g., to use the predicted behavior in planning considerations of the vehicle). In this way, models may be allocated to objects to make the best use of available processing resources.

In some examples, a model may define an algorithm for use in predicting behavior of an object. In some examples, a model to predict object behavior may include one or more machine learned algorithm(s) to identify, detect, and/or classify attributes of a detected object. In some examples, the model may include one or more classifiers. A classifier can be representative of a decision tree, a Neural Network, a Naïve Bayes classifier, and/or other algorithm(s) that perform classification. In some examples, a classifier may represent a function that assigns a class or label to an object, targets an object in an environment, and/or categorizes an object. In some examples, a classifier can be used with a machine learning technique to train a model to perform a function (e.g., detect attributes of an object, etc.). For instance, a first model may detect that an object is a vehicle, and then the first model (or alternatively a second model) may run additional classifiers related to the vehicle to make a more detailed prediction about the behavior of the object (e.g., classifying an overall condition of the vehicle, etc.).

A vehicle computing system may dedicate available resources (e.g., a memory resource and/or a processing resource) to models to provide more of the available resources to models processing more relevant objects, and less resources for models processing less relevant objects. By way of example and not limitation, a model may perform a higher level of processing for a near-by vehicle that is pulling over (e.g., may implement a finer level of movement detection to detect a person exiting the vehicle) as compared to a level of processing used by a model that detects actions of a pedestrian located behind the vehicle (e.g., a coarser level of movement detection since the pedestrian is less likely to impact operation of the vehicle). In some examples, objects determined not to be relevant to a potential action of the vehicle may be associated with a model that performs different predictive processing (simulations, estimated states, interaction modeling, collision estimation, etc.) to reduce computational load during vehicle planning. By determining a model according to relevance of an object, memory and processing resources are made available to models that predict behavior for the objects most likely to impact the safe operation of the vehicle in the environment thereby providing different levels of "attention" to different objects.

At operation 510, the process may include inputting at least a portion of the sensor data 512 into the determined model. As noted above, one or more of the first model 514A, the second model 514B, and/or the Nth model 514N may be determined to use to predict object behavior. In some examples, a vehicle computing system (e.g., vehicle computing system 404) may input sensor data corresponding to one or more objects into at least one of the models. In some examples, the sensor data may be representative of a detection associated with the object. Different amounts of sensor data may be input into a model suitable for performing prediction techniques specified by the model. In some examples, different models may receive different amounts and types of sensor data. In such examples, the vehicle computing system may input sensor data into a first model to detect an object (e.g., a pedestrian proximate to a crosswalk) and may input at least a portion of the sensor data (or additional or new sensor data) into a second model that may employ more computing resources and/or use different (e.g., more sophisticated) classifiers than the first model. In some examples, the second model may comprise a machine learned model trained to predict behavior of a pedestrian based on one or more facial, gesture, audio, or other signals. The output of the first model and the second model may be used by a vehicle computing system (e.g., a planning component) to control operation of the vehicle. Predictions from models that utilize different levels of computation may be fed to a planning component of the vehicle to improve how the vehicle navigates (avoids and/or interacts with objects) in the environment. In some examples, multiple models may be used for certain objects.

At operation 516, the process may include receiving an output from a model representing a predicted behavior of the object. In some examples, a vehicle computing system (e.g., vehicle computing system 404) may receive one or more outputs 518 for a detected object 520 from the first model 514A, the second model 514B, and/or the Nth model 514N. In some examples the output(s) 518 from one or more models may be received by a remote device that is separate from the vehicle. In various examples, the predictions output by the models may be used to improve operation of the vehicle by gaining computational resources (e.g., repurposing available computational resources) that otherwise would be spent on models associated with objects less likely to impact the safety of the vehicle.

At operation 522, the process may include adjusting one or more setting(s) of the vehicle. In some examples, data representing an output from a model is sent to a perception component (e.g., perception component 422) to change at least one of a resolution, a bit rate, a rate of capture, or a compression at which sensor data is captured or stored. In various examples, setting(s) associated with the sensor system (e.g., sensor system 406) may be adjusted to cause one or more sensors of the vehicle to change operation based at least in part on a signal output from a model and sent to the perception component. Additionally or alternatively, the dashed line from operation 502 illustrates that adjusting one or more settings (operation 522) may occur in response to detecting an object in the environment. That is, changes in resolution, a bit rate, a rate of capture, or a compression may occur, in some examples, independent of the perception component receiving an output from the model. Adjusting setting(s) may improve detection operations by making different types of sensor data available for input into various models. In various examples, a first model may specify at least one algorithm or at least one computational resource that is absent from the second model. In such examples, the first model may use at least one of memory allocation, a processor load, or a computation time that is absent from the second mode.

At operation 524, the process may include controlling operation of the vehicle based at least in part on the predicted behavior. In various examples, a planning component (e.g., planning component 424) of the vehicle computing system may use the predictions received from the first model 514A, the second model 514B, and/or the Nth model 514N to control a vehicle as it navigates in an environment (vehicle 526 using trajectory 528). In various examples, predictions from the first model 514A, the second model 514B, and/or the Nth model 514N enable a planning component of the vehicle to improve how the vehicle navigates (avoids objects) in the environment.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 508, 510, 516, and 524 may be performed without operations 502 and operations 502, 508, 510, 516, and 524 may be performed without operation 522. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: a sensor associated with a vehicle traversing an environment; one or more processors; and non-transitory computer-readable storage media storing instructions that, when executed by the one or more processors, cause the system to perform operations comprising: receiving sensor data from the sensor; determining an object represented in the sensor data; determining, based at least in part on one or more of the sensor data or map data associated with the environment, a feature associated with the object; determining, based at least in part on the feature, a model from among multiple available models; inputting at least a portion of the sensor data into the model; receiving, from the model, output indicative of behavior of the object; and controlling operation of the vehicle based at least in part on the output.

B: A system as paragraph A describes, wherein the model comprises a first model and the multiple available models include a second model, and wherein the first model is more computationally intensive than the second model.

C: A system as paragraphs A or B describe, wherein the model comprises a first model and the output comprises a first output, the operations further comprising: determining, based at least in part on one or more of the feature or the output indicative of the behavior of the object, a second model; inputting at least a portion of the sensor data into the second model; and receiving, from the second model, second output indicative of behavior of the object; wherein controlling operation of the vehicle is further based at least in part on the second output.

D: A system as paragraphs A-C describe, wherein: the first model is trained to output at least one of a detection of the object or a classification of the object; and the second model is trained to output at least one of a velocity of the object, a predicted trajectory of the object, a pose of the object, a subclassification of the object, a detection of a portion of the object, a detection of a face, or a detection of a gesture.

E: A system as paragraphs A-D describe, wherein the feature comprises at least one of: a semantic classification of the object; an attribute of the object; an attribute of the environment; a proximity of the object relative to the vehicle; an attribute of the vehicle relative to another object in the environment; a location of the object; a velocity of the object relative to a velocity of the vehicle; a route of the vehicle to a destination in the environment; a context of the object; a region adjacent to the vehicle; a likelihood that the object will impact operation of the vehicle; an interaction between the object and the vehicle; or an interaction between objects in the environment.

F: A non-transitory computer-readable storage media storing instructions that, when executed, cause one or more processors to perform operations comprising: detecting an object in an environment around a vehicle based at least in part on sensor data; determining a feature associated with the object or the vehicle based at least in part on the sensor data or map data; determining a model for the object based at least in part on the feature; predicting, based at least in part on the model, a behavior of the object; and controlling operation of the vehicle based at in part on the output from the model.

G: A non-transitory computer-readable storage media as paragraph F describes, wherein the feature comprises a relevance of the object to operation of the vehicle.

H: A non-transitory computer-readable storage media as paragraphs F or G describe, wherein the feature comprises at least one of: a semantic classification of the object; an attribute of the object; an attribute of the environment; a proximity of the object relative to the vehicle; an attribute of the vehicle relative to another object in the environment; a location of the object; a velocity of the object relative to a velocity of the vehicle; a route of the vehicle to a destination in the environment; a context of the object; a region adjacent to the vehicle; a likelihood that the object will impact operation of the vehicle; an interaction between the object and the vehicle; or an interaction between objects in the environment.

I: A non-transitory computer-readable storage media as paragraphs F-H describe, wherein the model comprises a first model and a second model and the second model is more computationally intensive than the first model.

J: A non-transitory computer-readable storage media as paragraphs F-I describe, wherein the model comprises a machine learned model trained to output a classification of the object or recognize a gesture associated with the object.

K: A non-transitory computer-readable storage media as paragraphs F-J describe, wherein the model comprises a first model and the output comprises a first output, the operations further comprising: determining, based at least in part on one or more of the feature or the output indicative of the behavior of the object, a second model; inputting at least a portion of the sensor data into the second model; and receiving, from the second model, second output indicative of behavior of the object; wherein controlling operation of the vehicle is further based at least in part on the second output.

L: A non-transitory computer-readable storage media as paragraphs F-K describe, the operations further comprising sending an instruction to at least one of: a sensor of the vehicle to change at least one of a resolution, a bit rate, a rate of capture, a compression, at which sensor data is captured or stored; or a perception component to change an input of the perception component.

M: A method comprising: receiving sensor data from a sensor associated with a vehicle traversing an environment; determining, based at least in part on one or more of the sensor data or map data, a feature associated with the environment; determining, based at least in part on the feature, a model; inputting at least a portion of the sensor data into the model; receiving, from the model, output indicative of a behavior of an object in the environment; and controlling operation of the vehicle based at in part on the output.

N: A method as paragraph M describes, wherein the feature of the environment comprises at least one of: an attribute of the environment, an attribute of the object in the environment, map data, an occluded region, or a region of interest.

O: A method as paragraphs M or N describe, wherein the feature comprises a relevance of the object to operation of the vehicle.

P: A method as paragraphs M-O describe, wherein predicting the behavior of the object comprises determining an attribute of the object or a location of the object in the environment at a future time.

Q: A method as paragraphs M-P describe, further comprising sending an instruction to at least one of: a sensor of the vehicle to change at least one of a resolution, a bit rate, a rate of capture, a compression, at which sensor data is captured or stored; or a perception component to change an input of the perception component.

R: A method as paragraphs M-Q describe, wherein the model comprises a first model and the output comprises a first output, the operations further comprising: determining, based at least in part on one or more of the feature or the output indicative of the behavior of the object, a second model; inputting at least a portion of the sensor data into the second model; and receiving, from the second model, second output indicative of behavior of the object; wherein controlling operation of the vehicle is further based at least in part on the second output.

S: A method as paragraphs M-R describe, wherein: the first model is trained to output at least one of a detection of the object or a classification of the object; and the second model is trained to output at least one of a velocity of the object, a predicted trajectory of the object, a pose of the object, a subclassification of the object, a detection of a portion of the object, a detection of a face, or a detection of a gesture.

T: A method as paragraphs M-S describe, wherein the model comprises a machine learned model trained to output a classification of the object or recognize a gesture associated with the object.

While the example clauses described above are described with respect to one particular implementation, it should be understood that, in the context of this document, the content of the example clauses may also be implemented via a method, device, system, a computer-readable medium, and/ or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A non-transitory computer-readable storage media storing instructions that, when executed, cause one or more processors to perform operations comprising:
    detecting an object in an environment around a vehicle based at least in part on sensor data;
    determining a type of feature associated with the object or the vehicle based at least in part on the sensor data or map data;
    determining a first model for the object based at least in part on the type of feature;
    predicting, based at least in part on the first model, a first behavior of the object;
    determining a second model from among multiple available models based at least in part on the type of feature associated with the object;
    predicting, by the second model, a second behavior of the object; and
    controlling operation of the vehicle based at in part on the second behavior from the second model.

2. The non-transitory computer-readable storage media of claim 1, wherein the type of feature indicates a relevance of the object to operation of the vehicle.

3. The non-transitory computer-readable storage media of claim 1, wherein the type of feature comprises at least one of:
    a semantic classification of the object;
    an attribute of the object;
    an attribute of the environment;
    a proximity of the object relative to the vehicle;
    an attribute of the vehicle relative to another object in the environment;
    a location of the object;
    a velocity of the object relative to a velocity of the vehicle;
    a route of the vehicle to a destination in the environment;
    a context of the object;
    a region adjacent to the vehicle;
    a likelihood that the object impacts operation of the vehicle;
    an interaction between the object and the vehicle; or
    an interaction between objects in the environment.

4. The non-transitory computer-readable storage media of claim 1, wherein the second model is more computationally intensive than the first model.

5. The non-transitory computer-readable storage media of claim 1, wherein the first model comprises a first machine learned model trained to output a classification of the object and the second model comprises a second machine learned model trained to recognize a gesture associated with the object.

6. The non-transitory computer-readable storage media of claim 1, the operations further comprising:
inputting at least a portion of the sensor data into the second model; and
receiving, from the second model, second output indicative of the second behavior of the object;
wherein controlling operation of the vehicle is further based at least in part on the second behavior being associated with a finer level of movement detection with respect to the first behavior of the object.

7. The non-transitory computer-readable storage media of claim 1, the operations further comprising sending an instruction to at least one of:
a sensor of the vehicle to change at least one of a resolution, a bit rate, a rate of capture, or a compression, at which sensor data is captured or stored; or
a perception component to change an input of the perception component.

8. A method comprising:
receiving sensor data from a sensor associated with a vehicle traversing an environment;
determining, based at least in part on one or more of the sensor data or map data, a type of feature associated with the environment;
determining, based at least in part on the type of feature, a first model;
inputting at least a portion of the sensor data into the first model;
receiving, from the first model, a first output indicative of a behavior of an object in the environment;
determining a second model from among multiple available models based at least in part on the feature;
inputting at least a portion of the sensor data into the second model;
receiving, from the second model, a second output indicative of another behavior of the object; and
controlling operation of the vehicle based at in part on the second output of the second model.

9. The method of claim 8, wherein the type of feature associated with the environment comprises at least one of: an attribute of the environment, an attribute of the object in the environment, map data, an occluded region, or a region of interest.

10. The method of claim 8, wherein the type of feature comprises a relevance of the object to operation of the vehicle.

11. The method of claim 8, wherein predicting the behavior of the object comprises determining an attribute of the object or a location of the object in the environment at a future time.

12. The method of claim 8, further comprising sending an instruction to at least one of:
a sensor of the vehicle to change at least one of a resolution, a bit rate, a rate of capture, a compression, at which sensor data is captured or stored; or
a perception component to change an input of the perception component.

13. The method of claim 8, wherein:
the first model is trained to output at least one of a detection of the object or a classification of the object; and
the second model is trained to output at least one of a velocity of the object, a predicted trajectory of the object, a pose of the object, a subclassification of the object, a detection of a portion of the object, a detection of a face, or a detection of a gesture.

14. The method of claim 8, wherein the first model comprises a machine learned model trained to output a classification of the object and the second model is not a machine learned model.

15. A system comprising:
a sensor associated with a vehicle traversing an environment;
one or more processors; and
non-transitory computer-readable storage media storing instructions that, when executed by the one or more processors, cause the system to perform operations comprising:
detecting an object in an environment around a vehicle based at least in part on sensor data;
determining a type of feature associated with the object or the vehicle based at least in part on the sensor data or map data;
determining a first model for the object based at least in part on the type of feature;
predicting, based at least in part on the first model, a first behavior of the object;
determining a second model from among multiple available models based at least in part on the type of feature associated with the object;
predicting, by the second model, a second behavior of the object; and
controlling operation of the vehicle based at in part on the second behavior from the second model.

16. The system of claim 15, wherein the type of feature indicates a relevance of the object to operation of the vehicle.

17. The system of claim 15, wherein the type of feature comprises at least one of:
a semantic classification of the object;
an attribute of the object;
an attribute of the environment;
a proximity of the object relative to the vehicle;
an attribute of the vehicle relative to another object in the environment;
a location of the object;
a velocity of the object relative to a velocity of the vehicle;
a route of the vehicle to a destination in the environment;
a context of the object;
a region adjacent to the vehicle;
a likelihood that the object impacts operation of the vehicle;
an interaction between the object and the vehicle; or
an interaction between objects in the environment.

18. The system of claim 15, wherein the second model is more computationally intensive than the first model.

19. The system of claim 15, wherein the first model comprises a first machine learned model trained to output a classification of the object and the second model comprises a second machine learned model trained to recognize a gesture associated with the object.

20. The system of claim 15, the operations further comprising:
  inputting at least a portion of the sensor data into the second model; and
  receiving, from the second model, second output indicative of behavior of the object;
  wherein controlling operation of the vehicle is further based at least in part on the second behavior being associated with a finer level of movement detection with respect to the first behavior of the object.

* * * * *